US008419987B2

(12) United States Patent
Neumann

(10) Patent No.: US 8,419,987 B2
(45) Date of Patent: Apr. 16, 2013

(54) EXTRUDER SYSTEM FOR EXTRUDING A FLUID

(75) Inventor: Frank Neumann, Langen (DE)

(73) Assignee: MMR Marketing & Management AG Rotkreuz, Rotkreuz (CH)

( * ) Notice: Subject to any disclaimer, the term of this patent is extended or adjusted under 35 U.S.C. 154(b) by 283 days.

(21) Appl. No.: 11/814,594

(22) PCT Filed: Jan. 28, 2005

(86) PCT No.: PCT/DE2005/000158
§ 371 (c)(1),
(2), (4) Date: May 5, 2008

(87) PCT Pub. No.: WO2006/079299
PCT Pub. Date: Aug. 3, 2006

(65) Prior Publication Data
US 2009/0020906 A1    Jan. 22, 2009

(51) Int. Cl.
*B28B 3/20*    (2006.01)
(52) U.S. Cl.
USPC ................. 264/176.1; 264/165; 264/211
(58) Field of Classification Search ............... 264/176.1, 264/165, 211
See application file for complete search history.

(56) References Cited

U.S. PATENT DOCUMENTS 3,686,377 A    8/1972    Hays
5,104,705 A    4/1992    Quackenbush et al.

FOREIGN PATENT DOCUMENTS

| CA | 2299209 A1 | 8/2001 |
| CA | 2299209 C | 5/2007 |
| DE | 10136851 | 2/2003 |
| EP | 0499025 | 8/1992 |
| EP | 0888860 | 7/1999 |
| EP | 1510603 A1 | 2/2005 |
| WO | 95/24304 | 9/1995 |
| WO | 00/01420 A2 | 1/2000 |
| WO | 00/73036 A2 | 12/2000 |
| WO | 0076743 | 12/2000 |
| WO | 01/28756 A1 | 4/2001 |
| WO | 03009989 | 2/2003 |
| WO | 03/102278 A1 | 12/2003 |

*Primary Examiner* — Yogendra Gupta
*Assistant Examiner* — John Robitaille
(74) *Attorney, Agent, or Firm* — Joyce von Natzmer; Agris & von Natzmer LLP

(57) ABSTRACT

The invention relates to an extruder system for extruding a fluid with at least one supply device, at least one mixer device and at least one extrusion die. In accordance with the invention at least one device for producing a fluid flow (transport fluid) that completely or partially surrounds the material to be extruded that essentially runs parallel to the outlet direction of the material to be extruded is provided, and whereby the fluid is discharged from the extruder system by suction and/or pressure of the transport fluid flow by means of an expulsion gas. The extruder system allows even product discharge for products well into the nanometer range.

43 Claims, 14 Drawing Sheets

EXTRUDER SYSTEM FOR EXTRUDING A FLUID

This is the U.S. national stage of International application PCT/DE2005/000158, filed Jan. 28, 2005 designating the United States.

The present invention relates to an extruder system for extruding a fluid, comprising at least one supply device, at least one mixer device, and at least one extrusion die.

From the state of the art extruder systems for extrusion are known in which a fluid to be shaped is pressed through an extrusion die so that it is ejected by the discharge nozzle of the die in the form of capillaries, strands, extruded film or other profile cross sections.

From the state of the art extruder systems with augers (simple or double augers) for the material supply and at the same time exclusively for generating pressure are known (e.g. WO 03/009989, EP 0 888 860 A2, DE101 36 851 A1). WO 00/76743 A1 describes a rotating extruder-nozzle structure with a mounted rotatable nozzle rotating at a speed of 500 rpm for products with a diameter of 16-40 mm. There is a similar, rotating extruder head in CA 2,299,209. Such extruder systems are not variable and therefore serve to produce products of quite specific dimensions, in particular also at very high pressure.

EP 0 499 025 describes the extrusion of hoses by means of a rotating mandrel using a fixed nozzle with annular clearance.

Finally, an extruder system is known from WO 95/24304 in which a fluid subjected conventionally to pressure, for example by an auger, is ejected from the extruder system through an extrusion die. To produce a capillary the extrusion die has an essentially hollow cylindrical form with a central core, so that the fluid emerges from the die in the form of a tube or hose. Here the cross section of the "tube" or "hose" can be reduced almost as far as the capillary range by using correspondingly small discharge cross sections of the die.

Thus in the state of the art only extruder systems working in a pressure range of 1000 to 1500 bar and suitable for products with a diameter of approx. 100 μm are known.

It is not possible to miniaturise the extruder system known from the state of the art further to achieve product dimensions in the range of a few micrometres or nanometres, as, if the diameter within the extruder is reduced further, the friction forces between the fluid to be shaped and the extruder become so high that pressurising the fluid no longer leads to a controlled discharge of the shaped product.

By comparison with the state of the art the present invention is based on the task of providing an extruder system that allows even further miniaturisation of the system. Such a system should allow a uniform product discharge for products well into the nanometre range.

The task in accordance with the invention is solved by providing an extruder system for extruding a fluid with at least one supply device, at least one mixer device and at least one extrusion die, whereby at least one device for producing a transport fluid flow that completely or partially surrounds the material to be extruded and essentially runs parallel to the direction of outlet of the material to be extruded is provided, and whereby the fluid is discharged from the extruder system by suction and/or pressure of the transport fluid flow.

Parallel transport fluid flow in the meaning of the invention is understood to mean that the material to be extruded is completely or partially surrounded by a fluid flow during product discharge.

As a result of the fact that a device for producing a fluid flow completely or partially surrounding the material to be extruded of a transport fluid different from the fluid flow of the fluid to be shaped is provided, it is possible to reduce the size of or even do completely without an otherwise usual device for pressurising the fluid to be discharged, as the fluid is discharged from the extruder system by suction and/or pressure of the transport fluid flow. In this case for example, a gas flow under pressure is introduced into the extruder system from the exterior and essentially guided within the extruder system to the direct surroundings of the strand of fluid to be shaped and carries along the fluid to be shaped and discharges it from the extrusion die. Furthermore, the transport fluid flow reduces the friction between the fluid to be shaped and the walls of the extruder. Here the materials serving as parent materials should first be liquefied in order to simplify the discharge.

The extruder system can be used for different kinds of fluids comprising organic and/or inorganic materials to produce strands, capillaries or even extruded film. If the fluid to be discharged is additionally subjected to a high pressure as is customary in the state of the art, injection mouldings can also be produced with the device in accordance with the invention. For this purpose it is necessary to arrange a closing unit and an injection moulding die specially provided for the extruder system behind the discharge nozzle.

One of the advantages of the invention is to be seen in the fact that this is ultimately a flexible and flexibly usable micro-extruder that serves for the production of a wide variety of products, such as
- strands, threads, micro-threads etc.
- tubes, capillaries, micro-capillaries etc.
- extruded film, microfilms etc., and also
- injection mouldings, micro injection mouldings.

Practical embodiments of the present invention in which the extrusion die is a device for producing a film, a microfilm, a strand, a micro-strand, a capillary or a micro-capillary are particularly preferred. The said products can be produced with the aid of the extrusion method at low cost and in large quantities.

In a preferred practical embodiment of the invention the discharge nozzle of the extrusion die or parts thereof can be exchanged. This design of the extruder system is advantageous, as it makes it possible to use one and the same system for differing applications, as different products can be produced by simply exchanging the discharge nozzle. Furthermore, the exchangeability is a prerequisite for miniaturising the system, for example in order to prevent clogging and to allow easy cleaning.

It is expedient if at least one device for producing a transport fluid flow completely or partially surrounding the material to be extruded is a pressure device and/or a suction device. In accordance with the invention the fluid to be produced is discharged by a pressure device or a suction device, or by a combination of pressure and suction devices. In some applications, for example when using the extruder system in accordance with the invention for an injector or a film nozzle, it can be an advantage to leave out the suction device.

In contrast to the solutions described in the state of the art for "pressure discharge" in extruders, in the meaning of the invention "pressure device" is not to be understood exclusively as the discharge pressure developed independently by the fluid to be produced, but as the additional support by a gas exerting pressure on the transport fluid (described here as expulsion gas). Furthermore, it is of significance that the expulsion gas reduces the wall friction extremely. This friction is the cause of the obstacle to product discharge in the lower micro-range, which according to the state of the art is countered with ever higher pressures (however, this solution does not attempt to overcome the cause, but instead only the effect). The use of the expulsion gas in accordance with the invention makes it possible to reduce the wall friction to almost zero. As a result the discharge pressure required is thus reduced critically by comparison with the state of the art.

The invention thus shows a possible way of countering the wall friction that increases extremely in the range of ever smaller products to be produced, of largely suppressing this friction and of even eliminating it.

Preference is also given to the combination of suction or pressure. This is because the transport fluid not only prevents contact of the product with the outer walls of the nozzle, for example, but can also be used as an entraining medium if its flow behaviour is set faster than the flow behaviour of the product to be produced. Here it is possible to achieve this effect by suction or pressure or simultaneous suction-pressure operation.

Furthermore, in accordance with the invention a compensating medium and a compensation duct for compensating any fluctuations in metering is provided over the transport fluid flow completely or partially surrounding the material to be extruded that supports the product discharge. The aforesaid supporting measures for product expulsion can be combined with each other and depend on the respective product to be produced.

Thus the greatest possible uniformity of metering can be achieved for discharge. In particular the suction mechanism realised by a suction head at the nozzle outlet is considered to be particularly advantageous in accordance with the invention. Because of this it is possible to use a substantially reduced pressure inside the extruder by comparison with that in known embodiments of extruders. A further advantage is to be seen in the uniformity of the product discharge that exists on the basis of the supporting suction effect from the exterior and the pressure from the interior. This achieves a high reproducibility, i.e. reproducible uniformity of product discharge.

It is advantageous here if at least one device for producing the parallel transport fluid flow is partly provided in the exchangeable parts. Thus optimal discharge of the fluid can be ensured even for an exchangeable extrusion die.

A practical embodiment of the invention in which a compensation duct for compensating metering fluctuations is provided over the transport fluid flow completely or partially surrounding the material to be extruded is preferred. A uniform thickness of the discharged products, e.g. thickness of a film, is targeted. The thickness of the material depends here primarily on the quantity of the material metered. For example, if the quantity of the material increases for a brief period due to a fluctuation in metering, at constant pressure more material is discharged too. However, if the transport fluid producing the discharge pressure is able to escape via a path other than through the discharge nozzle, the quantity of material discharged will remain constant.

A practical embodiment of the invention in which the dimensions of the extrusion die are adjusted to the fluid to be shaped in such a way that the fluid is discharged by the capillary forces emerging has proved to be advantageous. In conjunction with large-scale miniaturisation of the extruder system in accordance with the invention, this makes it possible to discharge the fluid to be shaped without having to subject the actual fluid to be shaped to high pressure.

It is expedient here if the extrusion die or parts thereof can be rotated by motor actuation about an axis parallel to the direction of discharge. The rotation of the extrusion die or one of its parts, preferably a mandrel arranged at a distance symmetrical to the cross section of the extruder system, that extends parallel to the direction of discharge in the extruder and in front of the discharge nozzle, leads to good mixing of the components of the fluid to be discharged. However, rotation is also advantageous when processing a fluid to be discharged that consists of only one component, as it leads to strong cross-linking of the individual molecules of the fluid and hence to an increase in the stability of the discharged product. The circumstance that the gas flow of the expulsion gas is guided through the mandrel itself is also helpful.

A practical embodiment of the invention in which at least one pulling device for drawing off the discharged fluid is arranged behind the discharge nozzle of the extrusion die has proved to be particularly advantageous. Such a pulling device on the one hand makes it possible to discharge the fluid from the extruder system even without additional pressurising of the fluid within the system, while on the other hand it also brings about stretching of the discharged product and hence reinforces the material by stretching the cross-linked structure.

If two pulling devices with differing pulling speeds are arranged in series, the stretching of the discharged material can be specifically controlled by setting the pulling speeds of the two pulling devices differently from one another in a particular ratio. In this connection, in accordance with the invention it is particularly advantageous if at least one of the pulling devices can be rotated parallel to the direction of pulling about an axis, thus allowing further twisting of the product and hence a further increase in stability. The drawing and twisting unit following this proves to be advantageous especially for capillary and thread production because it makes it possible to produce reinforced end products by drawing (known from the production of spinning fibre) and twisting (combination in one unit). Multiple arrangements, connected in series, reinforce this effect further. As this drawing and twisting unit is not advantageous for all applications (e.g. for film production), it can be provided or switched on as an option.

By way of alternative or in addition to rotating of the pulling devices, it is advantageous if the basic element of the extruder system, comprising a supply device, a device for producing pressure, a mixer device, and at least one extrusion die can be rotated about an axis parallel to the direction of discharge.

Depending on the fluid used that is to be discharged, it is expedient for the extruder system to be equipped with a heating and cooling device for the fluid so that it can be maintained at the respective optimal temperature during the individual processing steps. Furthermore, the heating device can be used to warm the fluid to be discharged to higher temperatures and thus to increase its flow capability.

For certain applications and for fluids and materials to be shaped, it is necessary to arrange a drying device for the discharged fluid behind the extrusion die. This is particularly the case when the respective fluid develops a solid and form-stable condition only after drying off.

It is expedient here if a cutting device for the discharged fluid is arranged behind the extrusion die so that the discharged products can be cut to lengths suitable for further processing.

In order to be able to transport and further process the discharged product, in a preferred practical embodiment of the invention a winding device for the discharged fluid is arranged behind the extrusion die so that the product can be wound as yard goods on spindles or the like.

A practical embodiment of the present invention in which at least one extrusion die is produced by micro-engineering (e.g. by means of etching techniques, mechanical and optical micro-processes (e.g. laser)) is particularly advantageous.

This allows strong miniaturisation of the device, whereby the products show dimensions such as cannot be achieved with extrusion dies produced with classic mechanical engineering methods.

It is expedient here if the internal diameter of a discharge nozzle for producing a micro-capillary has a diameter of less than 100 µm, preferably of less than 50 µm, and particularly preferably of less than 20 µm.

The present invention makes it possible to miniaturise the extruder system to such an extent that the basic element of the extruder system has a length of less than 20 cm, preferably of less than 15 cm, and particularly preferably of less than 8 cm.

It is expedient here if the diameter of the basic element of the extruder system is less than 5 cm, preferably less than 3 cm, and particularly preferably less than 1 cm.

The micro-extruder can be used flexibly. It is characterised by a modular structure that requires minimal installation space. Thanks to the minimal installation space, especially the mixing and discharge chamber in accordance with the invention, it is possible to execute the interior space of the micro-extruder almost completely free of dead space. This is achieved by

- using a compensating medium in the interior of the micro-extruder, whereby this medium should preferably be positioned as a viscous separating liquid at the start of the mixing chamber directly behind the seal of the last bearing; this allows exact pressure compensation and optimal pressure control in the supply of the components vis-à-vis discharge of the product. The evaluation and regulation is carried out outside the micro-extruder by means of exact pressure controllers. The advantage of this embodiment is that the actual bearing is treated gently and is protected as there is no product contact.
- using a single through shaft that has either a constantly diminishing diameter (from the mixing chamber on) or alternatively a constant diameter. This results in advantages for the production-related manufacture in that only one mounting is necessary, which in turn allows good true running, as well as higher levels of precision and lower tolerances, for simple maintenance and easily automated assembly.
- the fact that the pressure of each component inlet into the micro-extruder can be regulated and each inlet has at least sufficiently higher pressure for the respective components to be supplied. As a consequence these inlets cannot be clogged from the interior as there is a constant flow-through of the component; this thus rules out the possibility of backflow.
- having always only a minimal necessary quantity of the product in the mixing and discharge chamber of the micro-extruder in order to realise mixing and discharge in optimised time. This means exact controlling of the supply and tracking of the components in order to achieve a uniform quality and continuous product discharge.

These measures allow almost 100 percent product discharge with maintenance of the preselected formulation and the mixing achieved. The mixing only takes place in the last section of the micro-extruder and/or in the exchangeable nozzle; this ensures that there can be no demixing of the mixed components. The mixing can be carried out by
- rotation of the through shaft, and/or
- the tangential supply of the pressurised components and/or multiple tangential supply spread over the circumference of the pressurised components, and/or
- static mixing elements on the shaft and/or the inner wall of the housing.

The invention makes it possible to mix several components with high precision. The micro-extruder displays an integrated temperature control and thanks to its very small overall dimensions it can be used in stationary and portable manner. The dimensions of the micro-extruder can be selected such that the entire system can be used on any desk top. The extruder itself can be so small that it fits in any jacket pocket. Other dimensions may be preferred for a higher throughput. The products produced in this way can lie in the millimetre, micrometre, right up to the nanometre range.

A thickness of 0.5 mm to 1 µm is preferred for micro-strands and extruded film, and the lower nanometre range of up to 50 nm is also particularly preferred for films and even below this for micro-strands. Micro-capillaries can be produced with a diameter of less than 100 µm, preferably of less than 50 µm, and particularly preferably of less than 20 µm. This in turn makes the system highly flexible.

The invention can be used in a very wide variety of fields, for example—but not finally and restrictedly—in the extrusion and/or injection moulding of plastics, for the extrusion of spinning fibres in the clothing industry, for the production of nonwovens, as well as in the fields of life science, medicine, for the production of biocompatible materials, within the framework of minimal-invasive surgery, as well as in telecommunications, the rubber industry, seal technology, and the chemicals and pharmaceuticals sector.

Further advantageous measures are contained in the other claims. The invention is described below in further detail along with further advantages and potential applications and with the aid of the attached figures, whereby FIG. 1 shows a schematic view of the extruder system in a preferred practical embodiment;

FIG. 2 shows a schematic representation of a first practical embodiment of the mixing chamber and the extrusion die;

FIGS. 3a, b show schematic views of a second practical embodiment of the mixing chamber and the extrusion die;

FIGS. 4a-e show simplified views and detailed representations of the pulling device in accordance with the invention in various practical embodiments;

FIGS. 5a-e show various practical embodiments of the discharge nozzle of the extrusion die represented in FIG. 2;

Figure 7A:
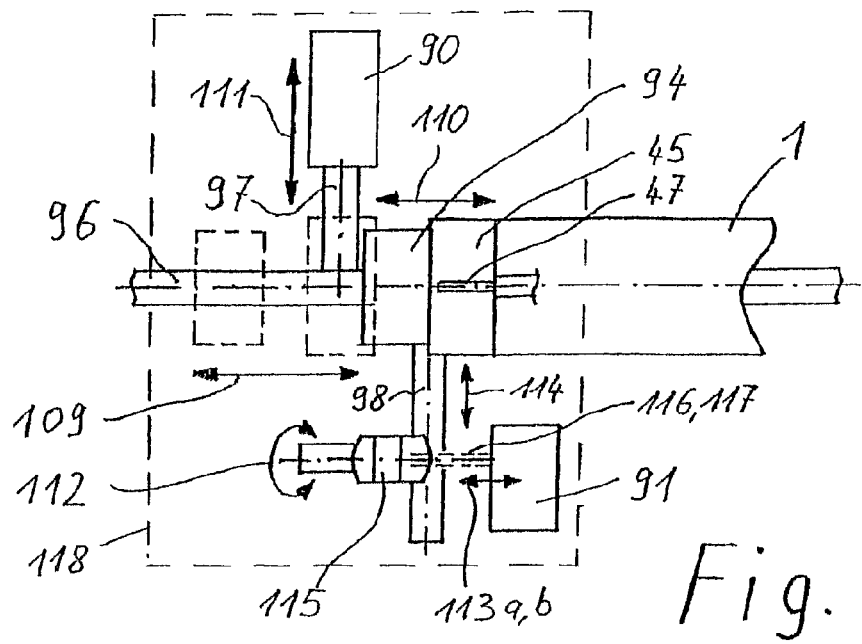
Figure 8A:
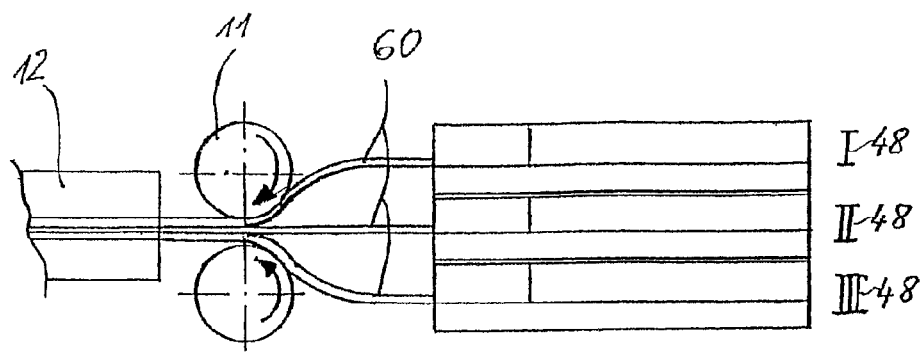
Figure 8B:
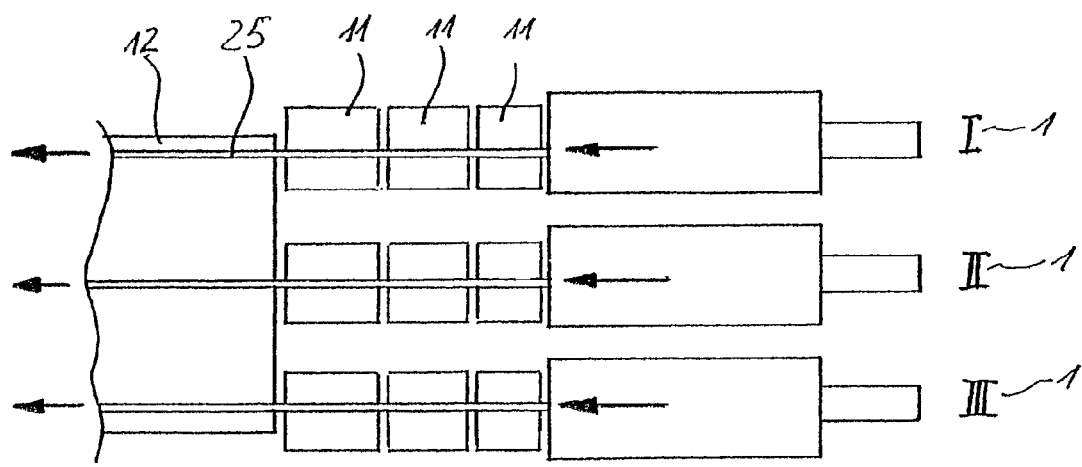
Figure 8C:
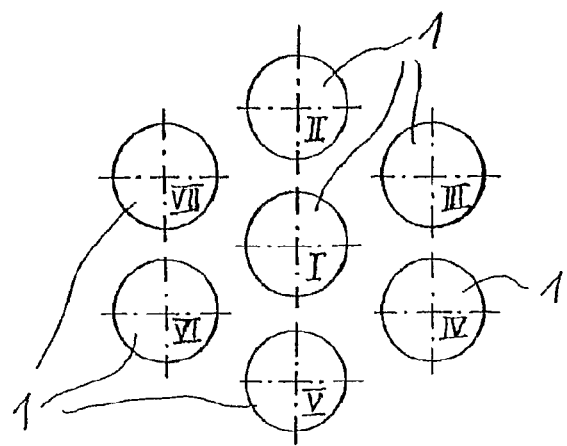
Figure 9A:
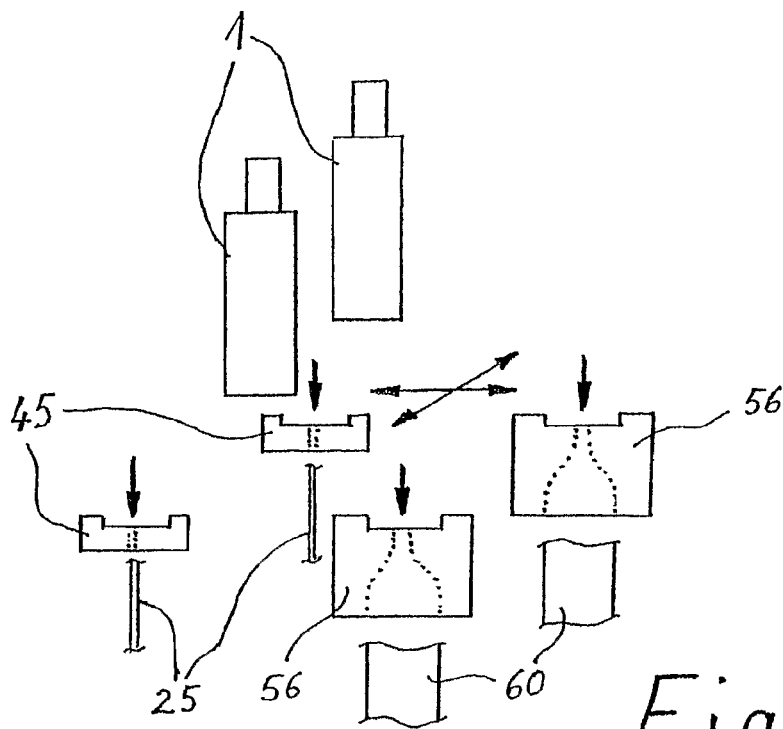

FIGS. 7a, b show in schematic form a practical embodiment of the device for automatically changing the discharge nozzles;

FIGS. 8a-c show a practical embodiment of the invention with several discharge nozzles;

FIGS. 9a, b show schematic representations of further practical embodiments of the extruder system in accordance with the invention.

Figure 1:
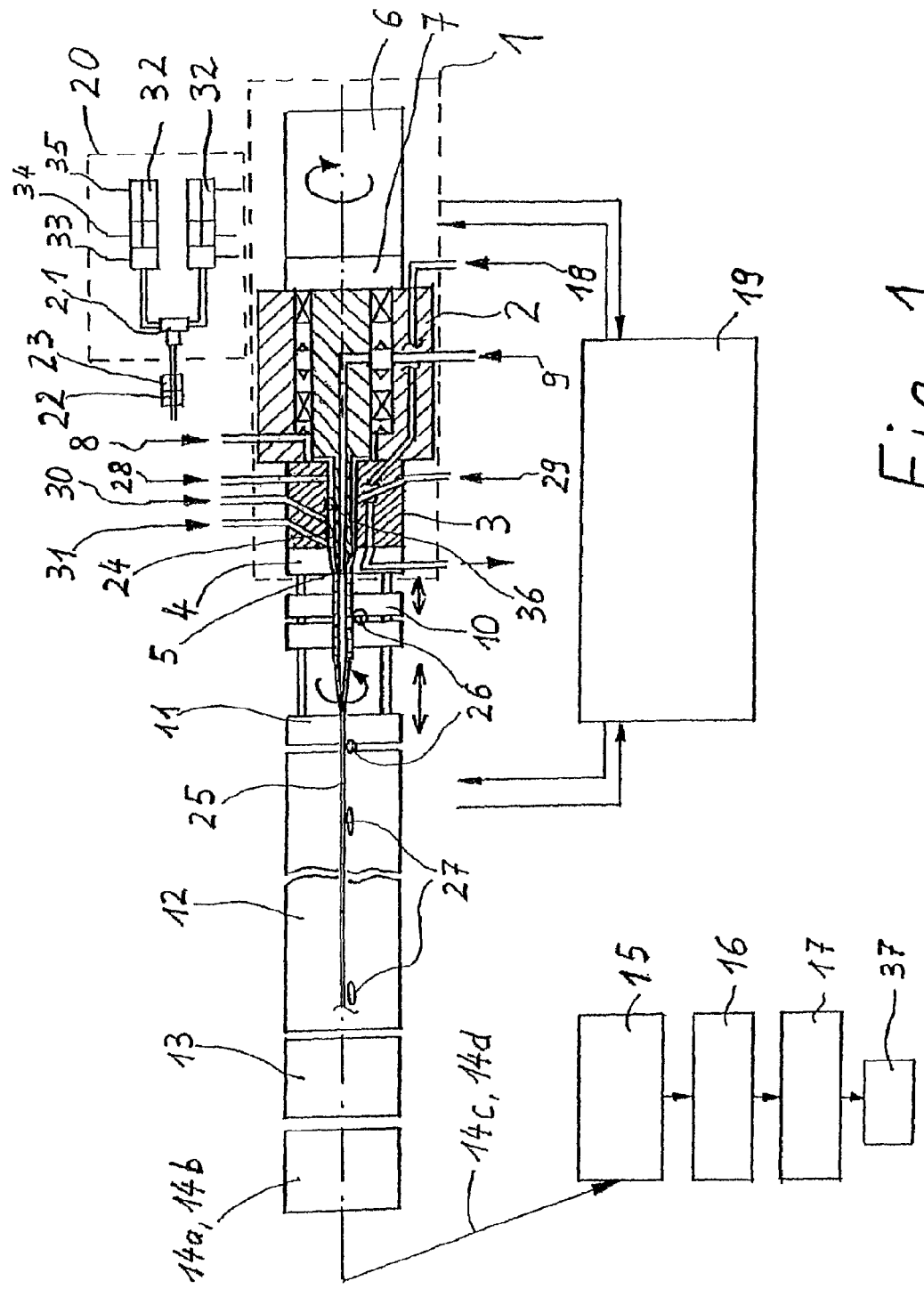

FIG. 1 shows a schematic view of the extruder system with an exchangeable extrusion die for producing a wide variety of products in the form of, for example, threads, fibres, strands 103 and/or capillaries 25. A die for producing a capillary is shown here by way of example.

The basic element 1 of the extruder system has a supply device 2, a mixer device 3, an extrusion die 4 with an exchangeable discharge nozzle 5, as well as an axial drive 6 with transmission 7. The expulsion gas 9 and the pressure medium 8 are introduced through the supply device 2. The transport fluid, hereinafter referred to as expulsion gas 9, led through the entire basic element 1 centrally up to the finished capillaries 25 in order to inflate these so that they cannot collapse on passing the discharge nozzle 5.

The pressure medium 8, for example a gas, that also serves as a protective atmosphere in the practical embodiment shown, or alternatively a non-miscible liquid is introduced outside the basic element 1 into a device for producing pressure 20. In the practical embodiment displayed, the device for producing pressure 20 consists of several pressure cylinders 32 that are coupled via a control valve 21. The cylinder 32 has an inlet 33 for the fluid 8, as well as a feed supply 35 and return supply 34 that can be designed as pneumatic, hydraulic or other devices. The device 20 produces an adjustable pressure that is controlled exactly via the control and instrumentation unit 19 of the system. The control is made possible by pressure sensors 23 and the pressure controller 22 that react and respond quickly.

The basic or parent material 28 is introduced with defined pressure into the mixer device 3. After this the additives 29 and admixtures 30 are metered into the mixing device 3 at a slightly higher pressure via a device similar to the device for producing pressure 20 or by other suitable measures and mixed together. The mixture is discharged through the extrusion die 4 in which a further component 31, for example a wetting agent for medical applications, such as e.g. formaldehyde or the like, is introduced additionally. The component 31 is thereby metered in shortly in front of the discharge nozzle 5 and after this conveyed to the discharge nozzle 5. Miniaturised sensors for monitoring the mixing 24 and/or pressure sensors 23 are arranged in the mixer device 3. The sensors for monitoring the mixing 24 and/or pressure sensors 23 can also be arranged in the following units such as the extrusion die 4 and the discharge nozzle 5 as a control against de-mixing of the material components.

The basic element 1 is additionally equipped with a heating/cooling device 18 in order to be able to produce a constant temperature, here for example room temperature preferably up to 22° C., that can be set and controlled with the control 19. The temperature is monitored with the aid of the temperature sensor 36, or also with several temperature sensors 36 arranged in the individual devices of the basic element 1. The control 19 is structured in such a way that it not only assumes the task of controlling the temperature, but also all other control tasks in the extruder system, for example the control and regulation of the actuators and drives.

After the emergence of the capillary 25 from the discharge nozzle 5, they are passed on to the pulling device 11 through the closing device 10 that has a closing mechanism for closing the discharge nozzle 5 and a mechanism for threading into the pulling device 11.

The extrusion die 4 or parts thereof such as a mandrel 47 is located rotatably about an axis that is co-linear with the capillaries 25 produced or the central supply of the expulsion gas 9. The rotation of the extrusion die 4 or parts thereof is driven by the axial drive 6 with the transmission 7. By contrast the pulling device 11 can enhance the rotation or reverse it in the opposite direction. At the same time the capillary 25 can be stretched to several times its produced length with the aid of the pulling device 11, as a result of which the material or cross-linking structure is substantially refined and strengthened.

The stretching of the capillary is monitored with the aid of sensors and detectors 26 and controlled electronically via the control and instrumentation unit 19 in order to prevent them from tearing. At the same time an intermediate quality control of the strength achieved, the wall thickness, the diameter, the uniformity of the capillaries etc. is conducted via the sensors 26.

After stretching and twisting to the desired length and above all to the necessary thickness or wall thickness, the capillaries 25 produced can be used directly, if e.g. the extruder system was installed directly at the point of the application.

There is a further possible way of transforming the capillaries 25 into a very permanent form of durability. In order to achieve this, a drying device 12 is provided in which the capillary 25 produced is dried up to a precisely defined residual moisture content. The monitoring is carried out by moisture sensors 27. After the drying device 12, a cutting device 13 and a winding device 14a or a folding and laying device 14b as well as an assembly unit 14c and packing unit 14d are necessary. After this, appropriate storage 15 and transport 16 to the various forms of application 17 worldwide are easily possible. In order to be able to pass on the dried capillaries 25 for appropriate use, it is necessary to treat them further accordingly, for example to moisten them for medical applications. Under certain circumstances a moistening device 37 is provided in order to achieve a previously defined moisture content.

Figure 2:
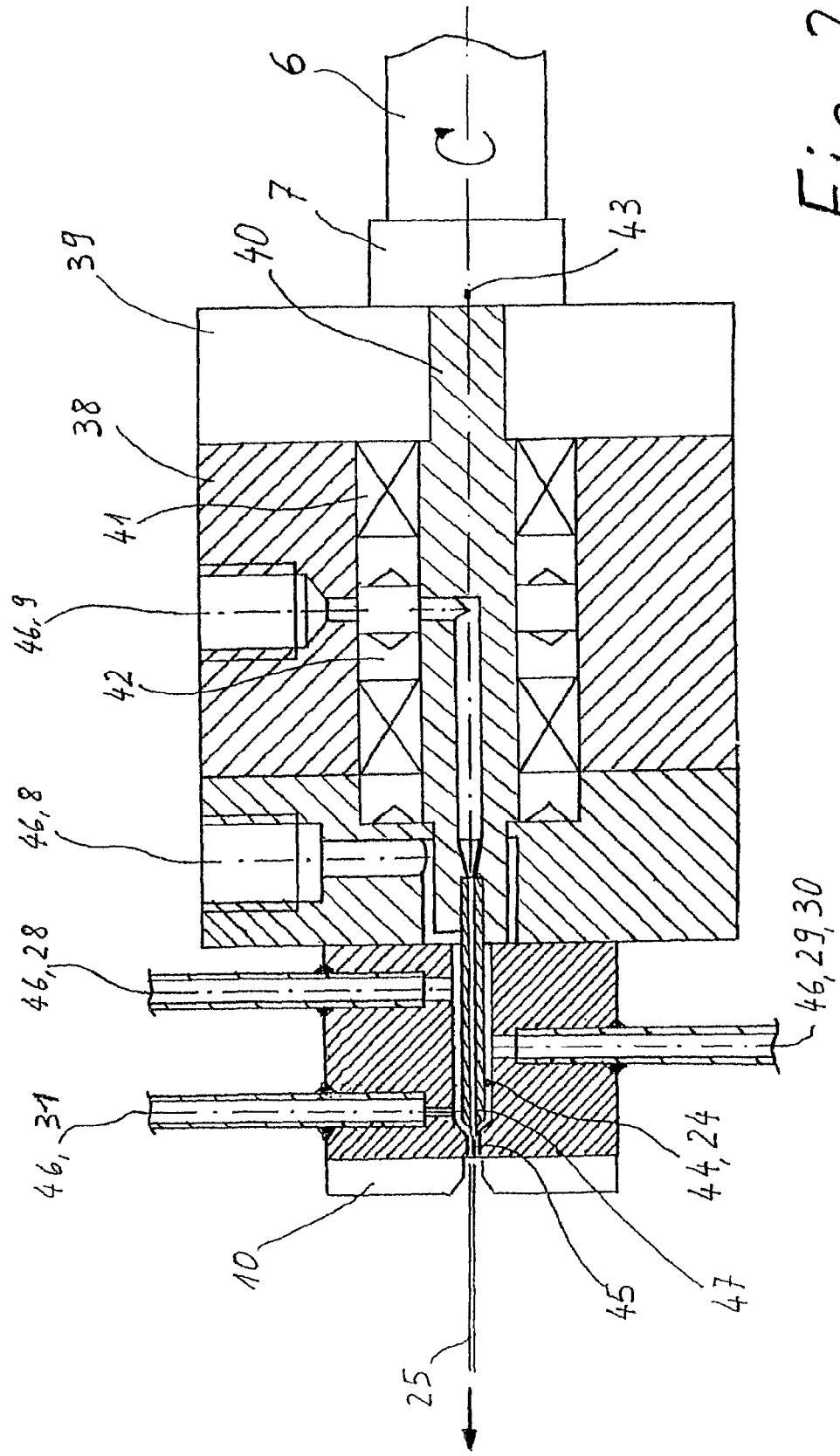

FIG. 2 is a schematic representation of a practical embodiment of the basic element 1 of the extruder system for producing a capillary 25. The structure of the basic element 1 is shown. It consists of a housing 38 with inlets 46 that are distributed about the circumference for the expulsion gas 9, the pressure medium 8, the basic/parent material 28, the additives 29, the admixtures 30 and a further component 31, as well as with inlets and outlets for the heating and cooling system 18 not shown here.

The housing 38 can be produced divided or as a whole depending on the production engineering facilities, whereby the desired dimensions that can lie in the order of magnitude of micrometres to millimetres are critical for this. The outer design of the housing 38 can be cylindrical and/or block-shaped. The housing 38 is closed with a flange cover 39 to which the transmission 7 and the drive 6 are secured. The drive 6 drives a through shaft 40 that is stepped in several places. Exact rotation is ensured by the preloaded bearings 41 that show minimal play. The bearings 41 are appropriate slide bearings and the seal packages 42 shown serve to separate the individual substances added and to protect the bearings 41. In order to realise the exact rotation of the through shaft 40, a compensation coupling 43 is provided between the through shaft 40 and the transmission 7.

After the basic/parent material 28, the additives 29 and the admixtures 30 have been metered in, they are mixed in the connecting mixing section 44 with the aid of the rotation of the through shaft 40. Other suitable measures for mixing are structuring the through shaft 40 in this area in the form of longitudinal slots or helical grooves or static mixing elements that are arranged on the through shaft 40 and/or on the housing 38. For micro-applications it is sufficient to produce appropriate roughness of the surfaces to achieve effective mixing.

In addition integrated sensors for monitoring the mixing 24 are arranged outside or preferably and more effectively inside the mixing section 44 in order to be able to monitor and influence the mixing operation via the control and instrumentation unit 19. Shortly before the end of the mixing section 44 a further component 31 is metered in so that the complete mixture makes its way into the nozzle head 45 that is designed to be exchangeable, for example as an exchangeable head, and is discharged as an enhanced capillary 25. As an alternative the nozzle head 45 can be firmly connected with the housing 38.

The production of the enhanced capillary 25 is supported by the expulsion gas 9 that is conveyed through the housing 38 into the through shaft 40 and there centrally up to the nozzle head 45 in order to inflate the capillary 25 from the inside. The expulsion gas 9 is also used as a heating and/or cooling medium. Alternatively to this the pressure medium 8 can be used as a heating and/or cooling medium. The pressure medium 8 can also be used as a compensating medium in the case of fluctuations in the metering of the product components supplied individually, or as an expulsion medium.

Figure 3A:
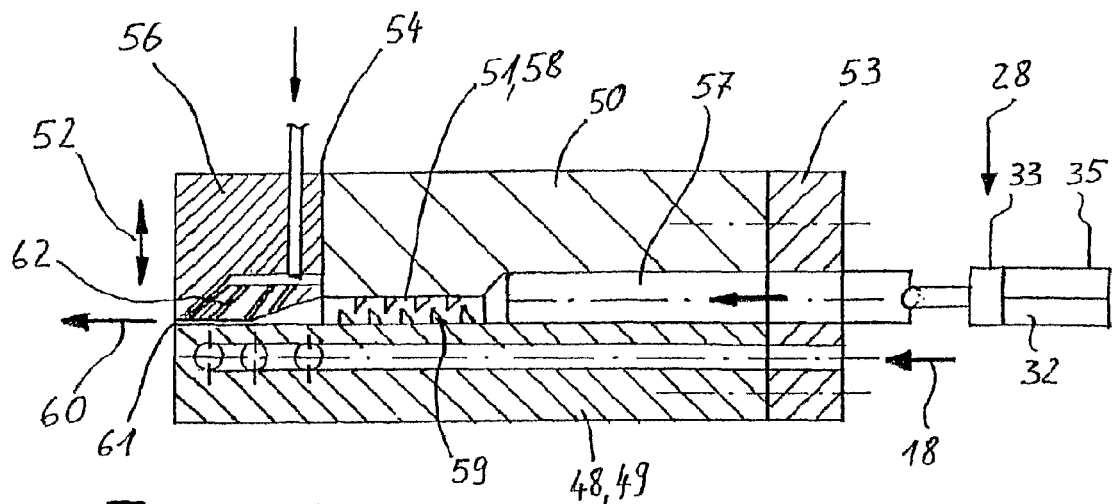

FIG. 3a is a schematic side view of an alternative practical embodiment of the basic element 48 with a discharge nozzle to produce reinforced extruded film 40. The alternative basic element 48 consists of a basic body 49, a cover plate 50 with structured duct 51 and a connecting plate 53 for the inlet of the basic/parent material 28, suitable sealing systems, corresponding pressure-resistant screw fittings and a flat film nozzle 56. The basic/parent material 28 is also metered with the aid of a device for producing pressure 20 as shown in the first practical embodiment (see FIG. 1). The heating and cooling system 18 is provided in the basic body 49. The cover plate 50 displays two areas, a pressure area 57 and a mixing section 58 whose volume is smaller than that of the pressure area 57, as well as inlets 46 for the additives 29, the admixtures 30, and for a further component 31 that is only added shortly before the end of the mixing section 58.

The mixing section 58 in the cover plate 50 displays static mixing elements 59, similar to the caterpillar mixing principle, whereby these mixing elements 59 have a tooth-like form. As an alternative the mixing elements can be structured similarly or differently with different basic forms (e.g. angular, round, arched, spherical, aspherical). In each case a similar structure is provided on the opposite side on the basic body 49, by way of alternative also a mirror-image structure. The structures of the mixing elements 59 are connected firmly and indivisibly with the basic body 49 and/or the cover plate 50 in the practical embodiment shown.

The flat film nozzle 56 is as shown exchangeably connected with the basic body 49 and the cover plate 50. This comprises advantages, such as for example changing to different film thicknesses and fast cleaning in the event of any possible clogging of the nozzle 56. The individual changeable nozzles 56 display a corresponding setting area 52 for the thickness of the film 60 at the outlet 61 that can be simply and exactly adjusted, set, and above all locked, and is set up by the operator or automatically set via appropriate actuators with the aid of the process control 19.

The position is corrected automatically during the film production via a corresponding control. In a different practical embodiment the flat film nozzle can also be a fixed component of the cover plate 50. By simulations an optimal nozzle inlet side and transition form up to the outlet slot 61 is found, so that the equal distributions of the pressure conditions are taken into account over the entire width and length and hence an optimal film 60 can be produced.

For easier expulsion of a reinforced film 60, additional expulsion gas nozzles 62 are installed within the flat nozzle 56. In the practical embodiment of the basic element 48 shown, as can be seen in FIG. 1, sensors (24, 36 that are not shown here) are provided inside the basic element 48 so that they can intervene in the process automatically via the control 19 in order to monitor the mixing and film production process. With the practical embodiment of the invention shown, films 60 with thicknesses in the range of micrometres to millimetres can be produced, in particular in the range of 0.5 mm to 1 μm, but also up to 50 nm. Even thinner thicknesses can be achieved with the use of the pulling device 11 behind the discharge nozzle shown in FIGS. 1 and 4a.

Figure 3B:
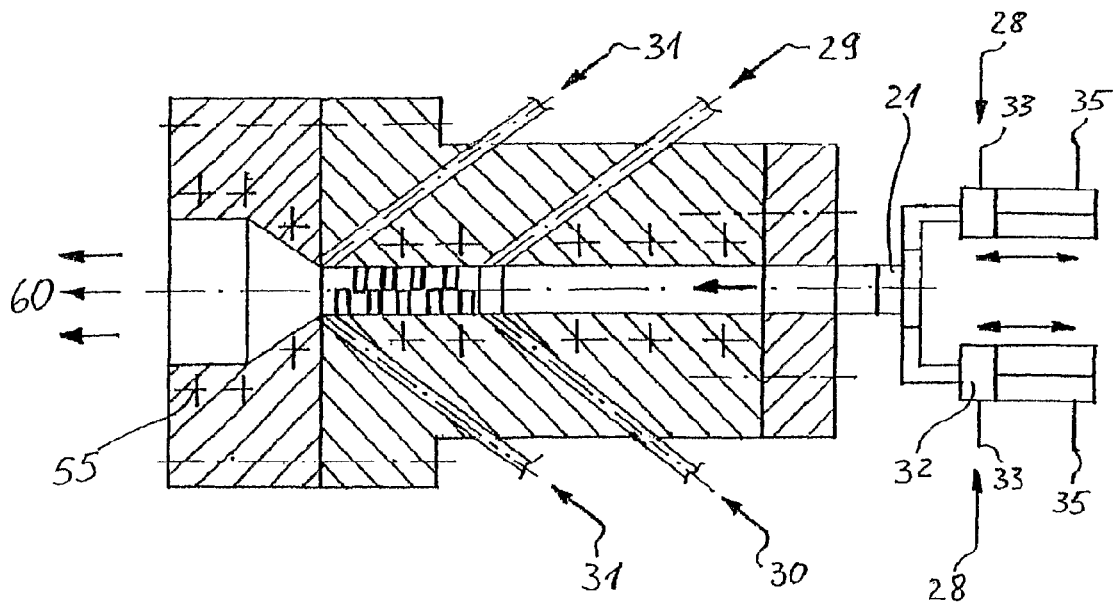

FIG. 3b shows a top view of the practical embodiment shown in FIG. 3a of the mixing device and the extrusion die with the discharge nozzle. It can be seen clearly how the supply of the basic/parent material 28 is realised. Two pressure cylinders 32 or pumps are switched via a valve 21 on the outlet side in such a way that a uniform fluid pressure results. This is controlled via the control and instrumentation 19 variably via the speed of the pressure cylinders 32. Inside the practical embodiment of the basic element 48 shown is the pressure area 57 into which the basic/parent material 28 is introduced as shown in FIG. 3a.

In the transition area to the mixing section 44 the additives 29 and admixtures 30 are added via separate inlets 46. It is equally possible to pre-mix additives 29 and admixtures 30 outside this alternative practical embodiment of the basic element 48 with appropriate metering and mixing units 63 (not shown here) in the desired ratio to each other and subsequently meter them directly or at a later time as a mixture. It should be noted here that the inlets 46 for the additives 29, the admixtures 30 and a further component 31 are arranged in the direction of flow, at an appropriate angle that can be determined exactly by simulations. The individual parts of the basic element 48 must be connected with each other pressure-tight, but detachable with appropriately designed screws 55, i.e. a sealing system 54 is provided between the individual parts without this sealing system 54 coming directly into contact with the product. Alternatively to this, for example, a completely sealable complete housing is possible, for example for a disposable unit. The width of the film nozzle 56 is selected freely in accordance with the respective application. A cylindrical outer form was selected for the basic element 48 shown here.

Figure 4A:
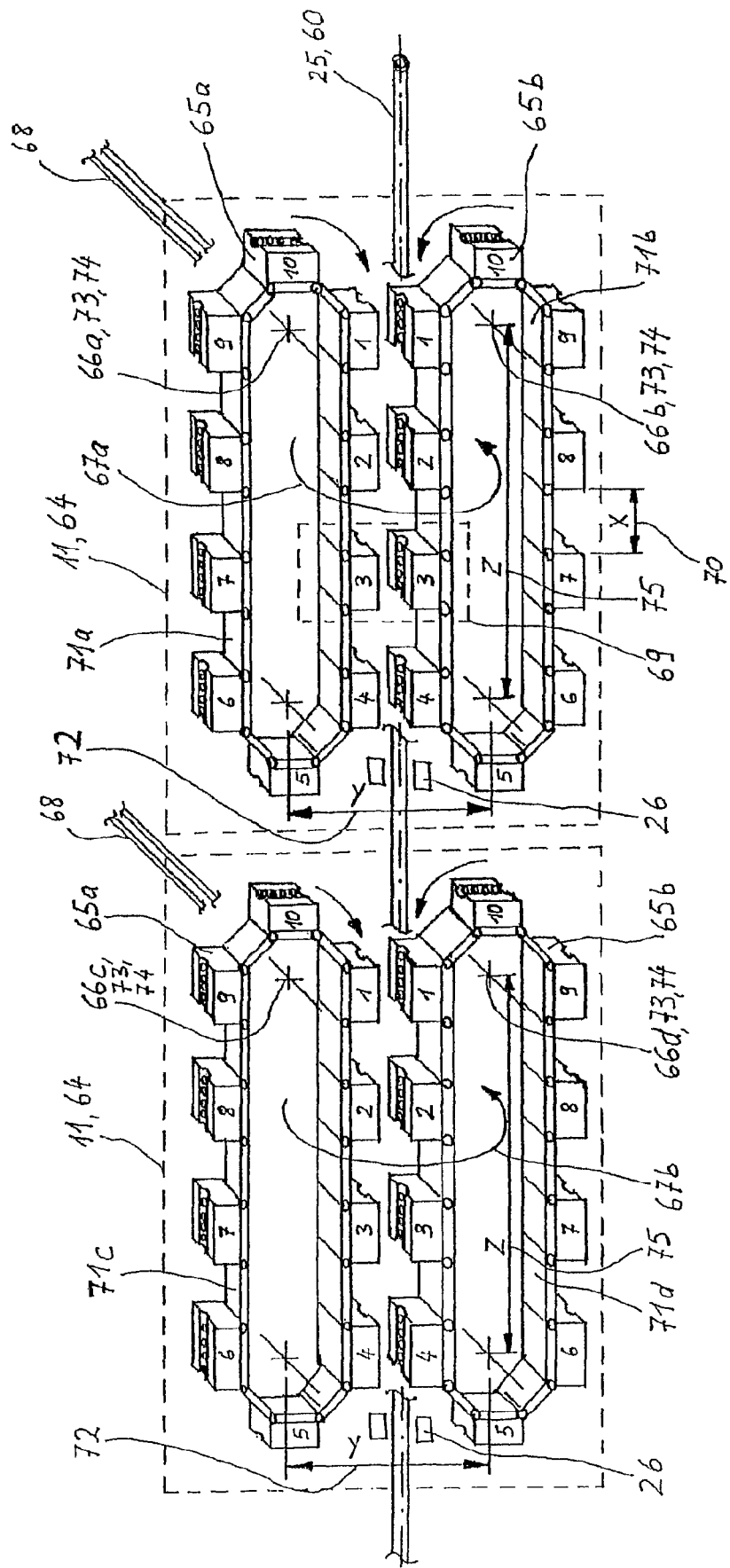

FIG. 4a is a simplified view of two pulling devices 11 arranged in series. With the first the capillary 25 and in other practical embodiments the strand, the fibre 103 or the film 60 are drawn out of the basic element (1, 48), while with the second the product 25 is drawn to the required length and thickness. Ideally these pulling devices 11 are integrated in a housing 64.

Each of the pulling devices 11 is equipped with the following features and functions:

The ten suction and/or pressure gripper units 65 allow a safe grabbing of the product (capillaries 25, fibres 103 or films 60) and a non-destructive release of the product (25, 60, 103) especially with structures with dimensions of the order of magnitude of micrometres and less. The number of suction and/or pressure gripper units 65 can vary depending on the area of application. The transport in the direction of expulsion is carried out with controllable drives 66 and the rotational movement about the product axis is carried out with controllable drives 67. For this a vacuum and compressed air supply 68 is provided that is only shown schematically in FIG. 4a. The grippers 65 are secured at regular intervals X (70) on a conveyor belt 71 with an adjustable and pre-stressed length Z (75). For one pulling device two of these conveyor belts 71a, 71b equipped with grippers are provided that lie exactly opposite each other and are counter-rotated, so that in the event of product contact a pair of grippers 69 always closes about the product like a pair of tongs. This arrangement is expedient as in this way the number of product-holding grippers 65 can be varied according to the application, whereby at least one pair of grippers 69 takes up and holds the product (25, 60, 103). The distance Y (72) between the two gripper conveyor belts 71 is designed so that it can be set and controlled in order to ensure safe and non-destructive pick-up and depositing of products (25, 60, 103) with differing dimensions. The drives 66 of the gripper conveyor belts 71 of each pulling device are connected in parallel in order to produce an adjustable and controllable pulling force for the product (25, 60, 103). The pulling force is monitored by suitable sensors, in the practical embodiment shown torque sensors 73, optical product monitoring sensors 26 and speed sensors 74, and regulated via the common control 19 in order to prevent rupturing of the capillary 25 or in other applications the fibre 103 or the film 60. The central axis of each pulling device 11 expediently coincides with the centre axis of the basic element (1, 48).

Figures 4B, 4C:
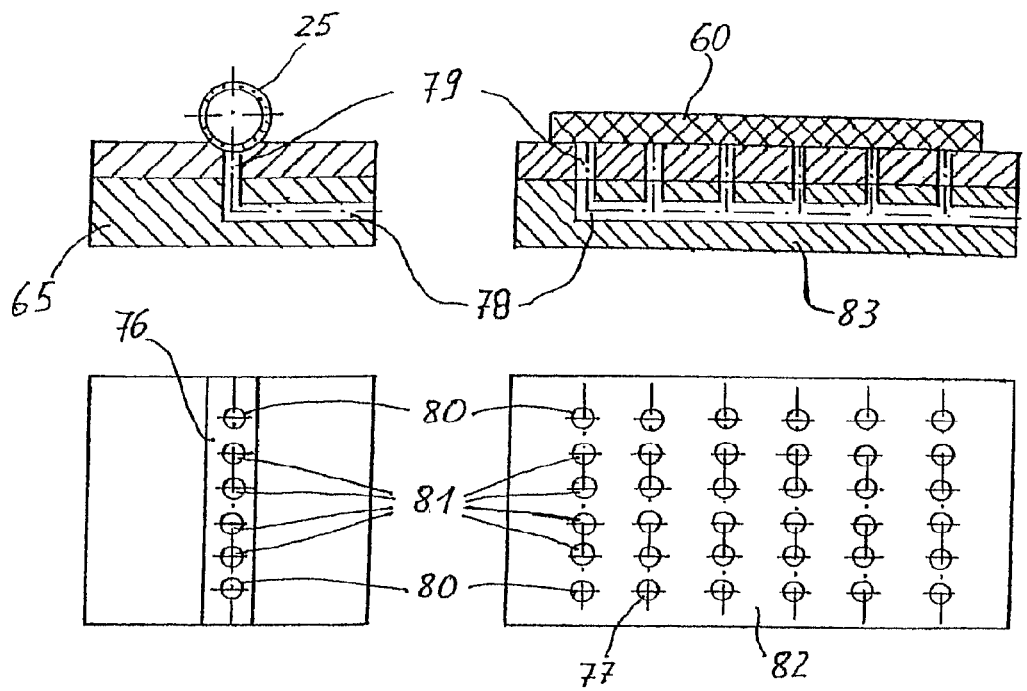

FIG. 4b shows a single gripper 65 for picking up the capillary 25 or also a fibre 103 in schematic form. The top half of FIG. 4b shows a side view, while the bottom half shows a top view. In the side view the gripper 65 with its semi-circular duct 76 for picking up the capillary 25 can be seen clearly in cross section. As in the practical embodiment shown, the gripper can be produced in two parts, or alternatively be produced as a single piece.

The duct 76 can alternatively also be less than half as deep as the radius of the circle on which it is based. However, its radius must roughly correspond to the outer radius of the capillary 25 or the fibre 103 in order to prevent destruction or deformation of the very small capillary 25 produced.

In the duct 76 small outlet and suction nozzles 77 are arranged centrally for vacuum and compressed air supply 68, that each displays a horizontal connecting duct 78 in the bottom third of the gripper 65 that is connected with the nozzle opening 77 through vertical connecting ducts 79.

In the top view (FIG. 4b bottom) the arrangement of the nozzles 77 in the duct 76 can be seen, whereby the number depends on the dimensions of the product (25, 103) but is basically freely selectable. To ensure safe guidance of the capillary 25 the duct 76 runs along the entire gripper 65. The nozzles 77 are distributed as follows: as blower nozzles 80 in the outer areas and as suction nozzles 81 in the middle part of the gripper 65. This distribution avoids possible excessively long adhesion of the freshly extruded capillary 25 to the nozzles 77. Alternatively the nozzles 77 are not divided into blowing and suction nozzles, but instead the nozzles are all together supplied with underpressure (vacuum) and only subjected to a compressed air gust shortly before releasing the product (25, 103) so that the grippers 65 become detached from the product (25, 103).

The grippers 65 for grabbing capillaries 25 or fibres 103 with dimensions in the micrometre or nanometre range are produced with the aid of micro-engineering production processes. These include micro-milling, micro EDM, ultra precision machining, various etching methods, thin-layer technologies, SU-8™ technology, spattering, coating processes, and LIGA processes.

FIG. 4c represents an individual gripper 83 for picking up films 60 schematically in a side view (FIG. 4c top) and in a top view from above (FIG. 4c bottom).

By contrast with the gripper 65 shown in FIG. 4b, in this practical embodiment the surface of the gripper 83 is smooth in order not to crush or bend the smooth, even film 60 produced. The width of the film gripper 83 may not be smaller than the film width produced and is constructed approx. ⅓ wider than the film 60 produced in order to be able to compensate any offsetting of the film in relation to the gripper. The nozzles 77 are distributed uniformly over the entire surface 82, with blower nozzles 80 at the edge and suction nozzles 81 in the middle part. By way of alternative nozzles of just one type may be provided that are supplied with an underpressure and are only subjected to a compressed air gust before letting the film go. The evenness of the gripper surface 82 is additionally improved by a special anti-stick coating in order to rule out any adhesion of the film 60.

Figures 4D, 4E:
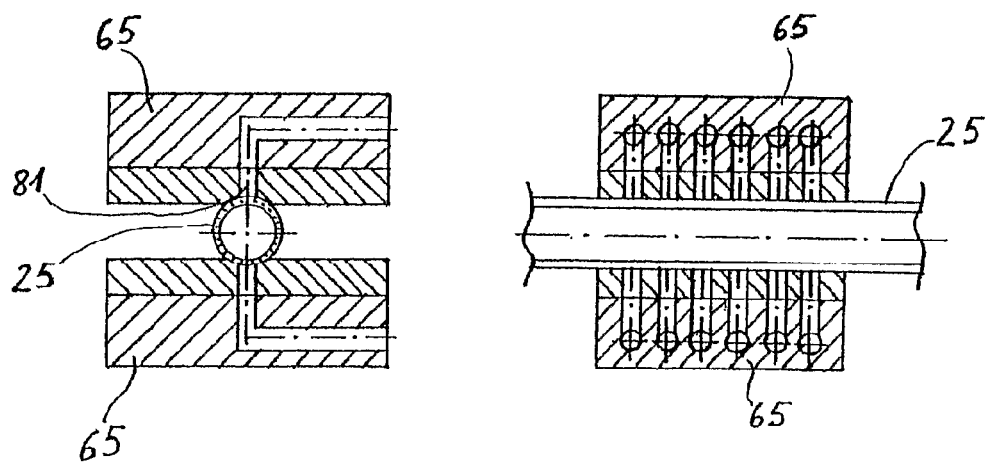

FIG. 4d shows a pair of grippers 69 with a picked up capillary 25 schematically in a section in a level perpendicular to the direction of movement of the capillary. The adherence of the capillary 25 due to the suction forces can be seen clearly. In order to avoid damage to the capillary 25, the distance between the two grippers must be varied when a capillary with different dimensions is to be produced.

FIG. 4e shows a pair of grippers 69 with a picked up capillary 25 in a side sectional view in a plane parallel to the direction of movement of the capillary 25.

Figure 5A:
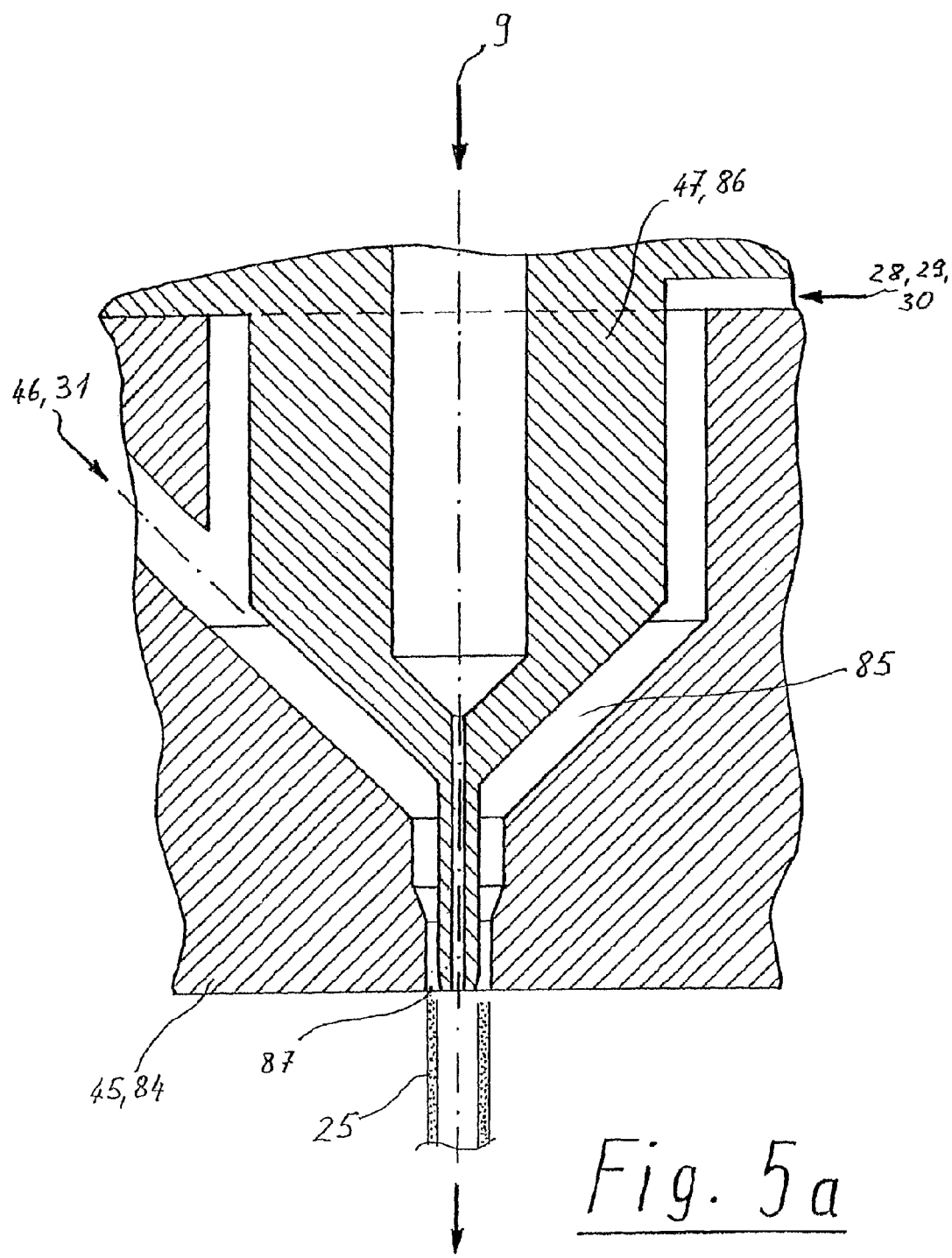

FIG. 5a is a sectional representation of a possible nozzle form of the nozzle head 45 of the basic element 1 shown in FIG. 2 to produce a reinforced capillary 25.

The practical embodiments shown and all other practical embodiments of the discharge nozzles 45 that are shown in FIGS. 5b-e and 6 can either be executed as firmly installed nozzles 45 or as exchangeable nozzles 45.

It is further possible to execute all the basic elements 1, 48 and their nozzles 45, 56 or parts thereof as items for one-off use. This is particularly advantageous for subsequent series production.

The nozzle 45 has a housing 84 that is produced from one piece or as a housing 84 divided in the middle and an inner core that is executed as a rod or micro-rod 47.

At the beginning of nozzle 45 is the inlet 46. As already described it is possible to introduce an additional component 31 through this shortly before the exit of the product 25.

Between nozzle housing 84 and rod 47 is a cavity designated as discharge chamber 85 that tapers towards the nozzle outlet side 87. Its cross section at the end of the nozzle may be just a few micrometres (depending on the application). The micro-rod 47 is completely hollow inside so that a medium 9, for example gas, preferably air, can be passed through to inflate the capillary 25.

As in the practical embodiment shown, the micro-rod 47 can be executed as an exchangeable part and at the start—here the part facing away from the nozzle outlet is meant—has a connection 86 (not shown in FIG. 5a) to the through shaft 40 of the basic element 1.

As in the practical embodiment shown, the connection 86 can be executed as a plug connection, preferably conical, but also as a screw connection or by way of alternative can also be welded or glued with an appropriate adhesive. It fixes the position of rod 47 in relation to the rest of the extrusion die. The exact centric position of the rod has a crucial influence on the true running of the rotation motion of the rod 47 with respect to the basic element.

As can be seen in FIG. 5a, the diameter of the discharge chamber is reduced step by step up to the nozzle outlet 87. It is necessary here to find an optimal transition angle and an optimal form of transition with the help of simulations.

Furthermore it is necessary to provide a suitable nozzle fastening and exchange system, not shown in FIG. 5a, that is tight enough and can safely withstand the necessary inner pressure.

The discharge nozzle 45 is produced with the aid of classic mechanical engineering processes and micro-engineering processes such as erosive procedures, e.g. wire-cut EDM and cavity-sinking EDM, or LIGA technologies (lithographic and galvanising processes). Discharge nozzles 45 for capillaries 25 with dimensions of the order of magnitude of millimetres and micrometres right down to the nanometre range can be produced with micro-engineering processes.

Figure 5B:
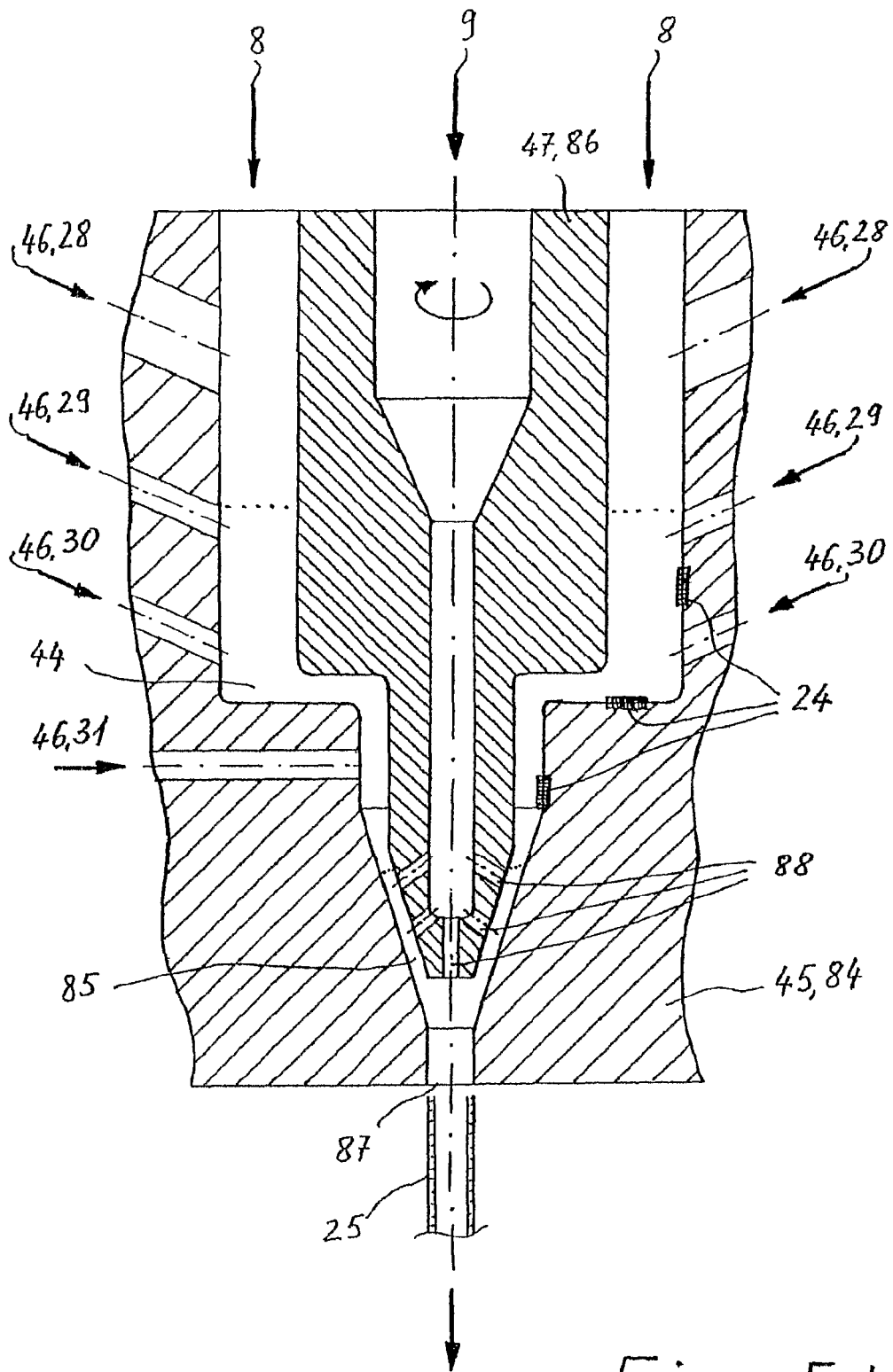

FIG. 5b shows a further practical embodiment of the discharge nozzle 45 that displays an optimised product discharge for the capillary 25 directly at the nozzle tip 87. There are lateral outlet apertures 88 in the rod or micro-rod 47 that point in the direction of flow at a shallow angle and are arranged at intervals around the entire circumference at the head of the micro-rod 47. Such lateral outlet apertures can alternatively also be arranged in the housing 84 or both in housing 48 and in the micro-rod 47. Furthermore, all inlets 46 for the pressure medium 8, the expulsion gas 9, the basic/parent material 28, the additives 29, the admixtures 30 and for the additional component 31 are shown. By way of example three positions for the sensor for monitoring the mixing 24 are shown in the mixing chamber 44. The lateral outlet apertures 88 in the micro-rod 47 provide additional support for the product discharge as they bring about a simpler and more even product discharge through the addition of an expulsion medium, here preferably a gas. This relieves the burden on the micro-rod (smaller frictional forces, avoidance of adhesions). The same applies to the possible additional outlet apertures in the inner wall of the housing in the area of the discharge/exchangeable nozzle.

Figure 5C:
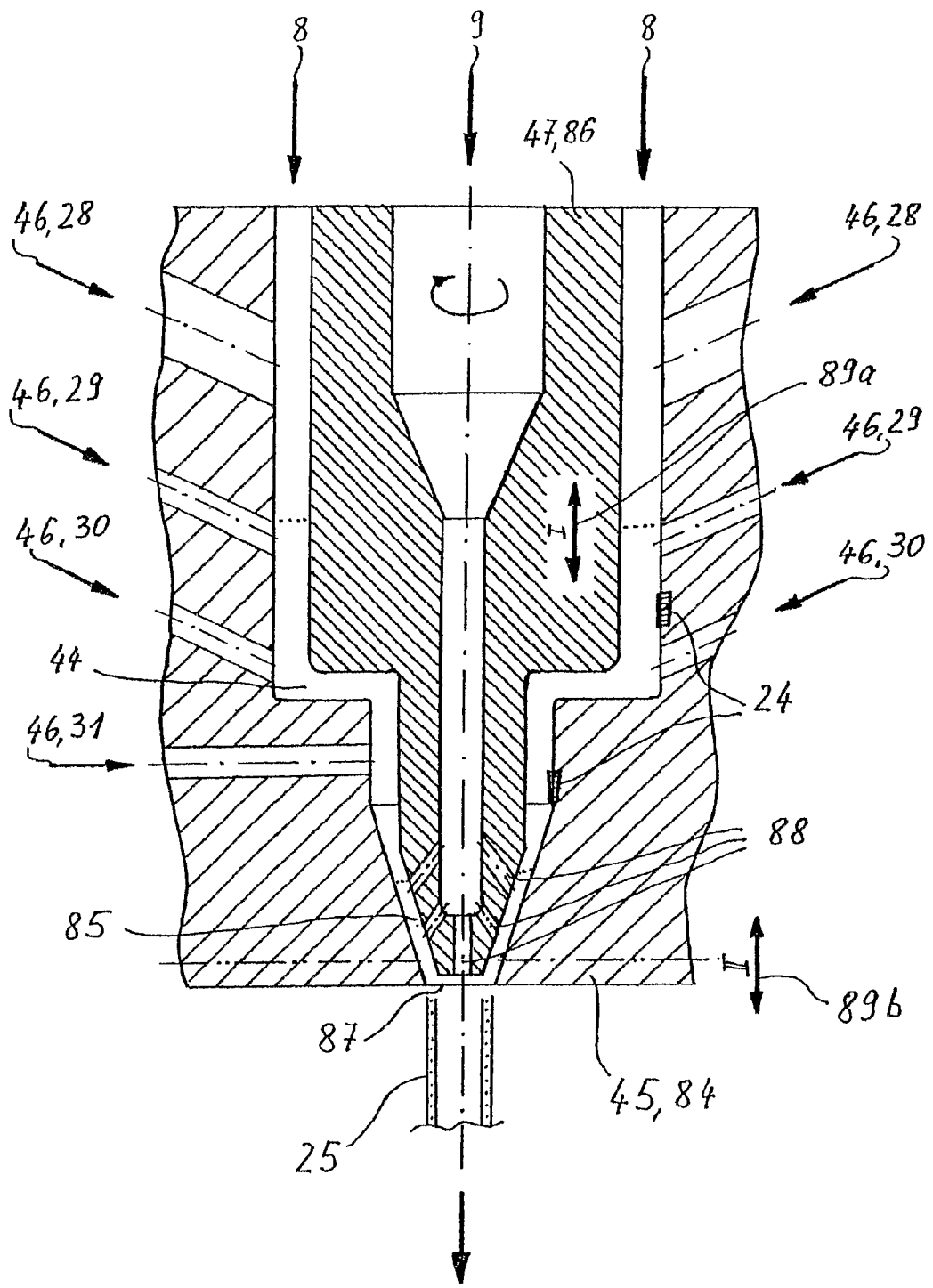

FIG. 5c shows a further possible practical embodiment of the discharge nozzle 45. In addition to the practical embodiment of nozzle 45 shown in FIG. 5b, the position of the rod 47 relative to the nozzle housing 84 is adjustable, as indicated by the arrow 89a. The positioning is effected automatically with the aid of the control and instrumentation unit 19. The wall thickness of the capillary is set via the position of rod 47 relative to the housing 84 in the direction of the course of the capillary 25 to be produced.

Figure 5D:
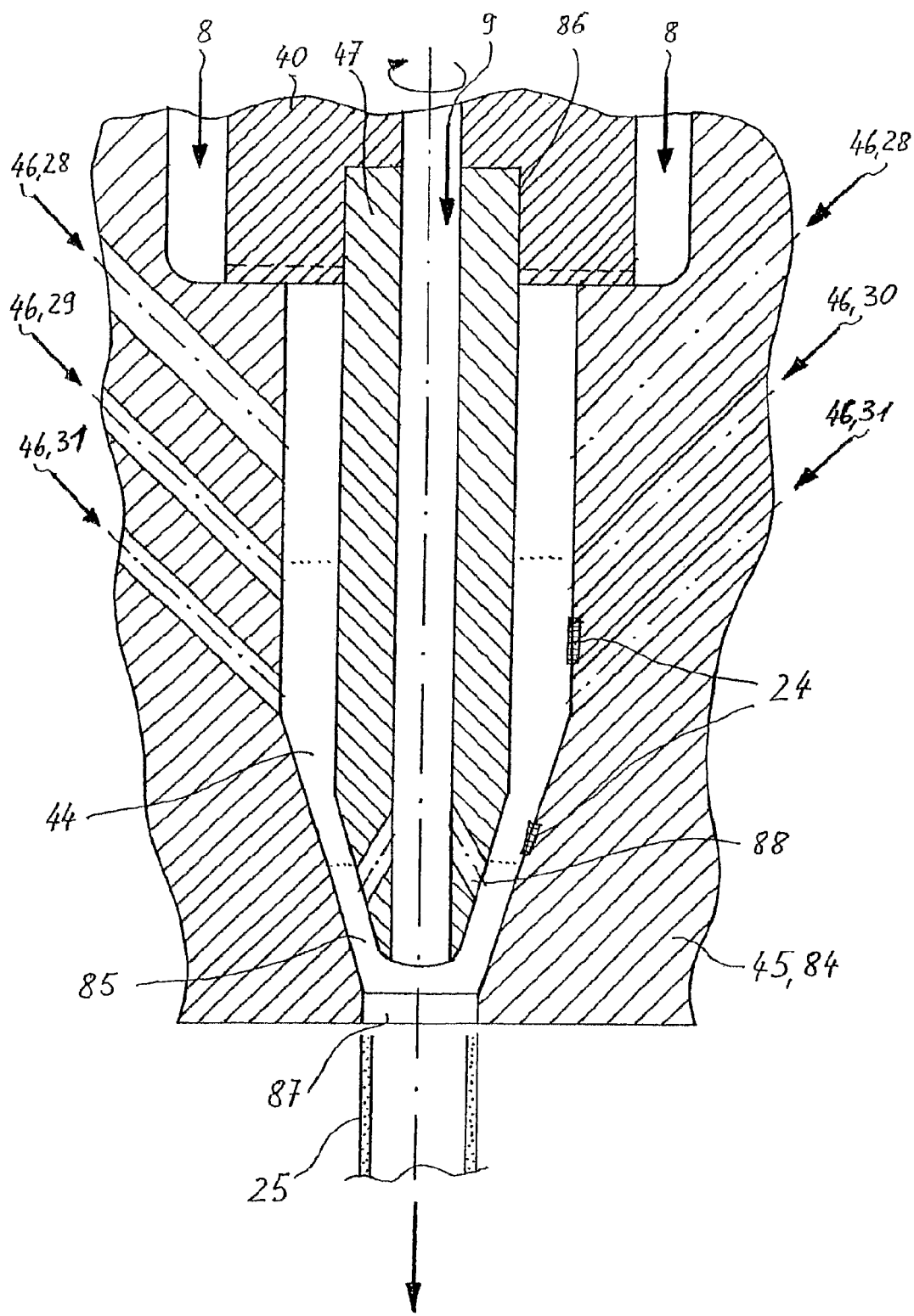

FIG. 5d represents a further practical embodiment of the discharge nozzle 45. It shows both a short mixing chamber 44 and a shortened discharge chamber 85 with which a reinforced capillary 25 may yet be produced.

The nozzle 45 shown has a nozzle outlet aperture 87 with an outer diameter of 20 μm. Such a nozzle is in particular suitable for producing products in the micrometre range, for example capillaries.

In contrast to the practical embodiments shown in FIGS. 5a-c, FIG. 5d also shows the connection 86 to the through shaft 40 of the rod/micro-rod 47. The shortened construction design of the extrusion die also facilitates production. The rod is executed as an exchangeable part and thanks to a plug connection can easily be removed from the through shaft 40. That is why it is easier to clean the nozzle. Moreover here it is also possible to convert the extruder system quickly by exchangeable nozzle heads 45 and exchangeable micro-rods 47 to adapt to other diameters of the capillary 25 to be produced.

Figure 5E:
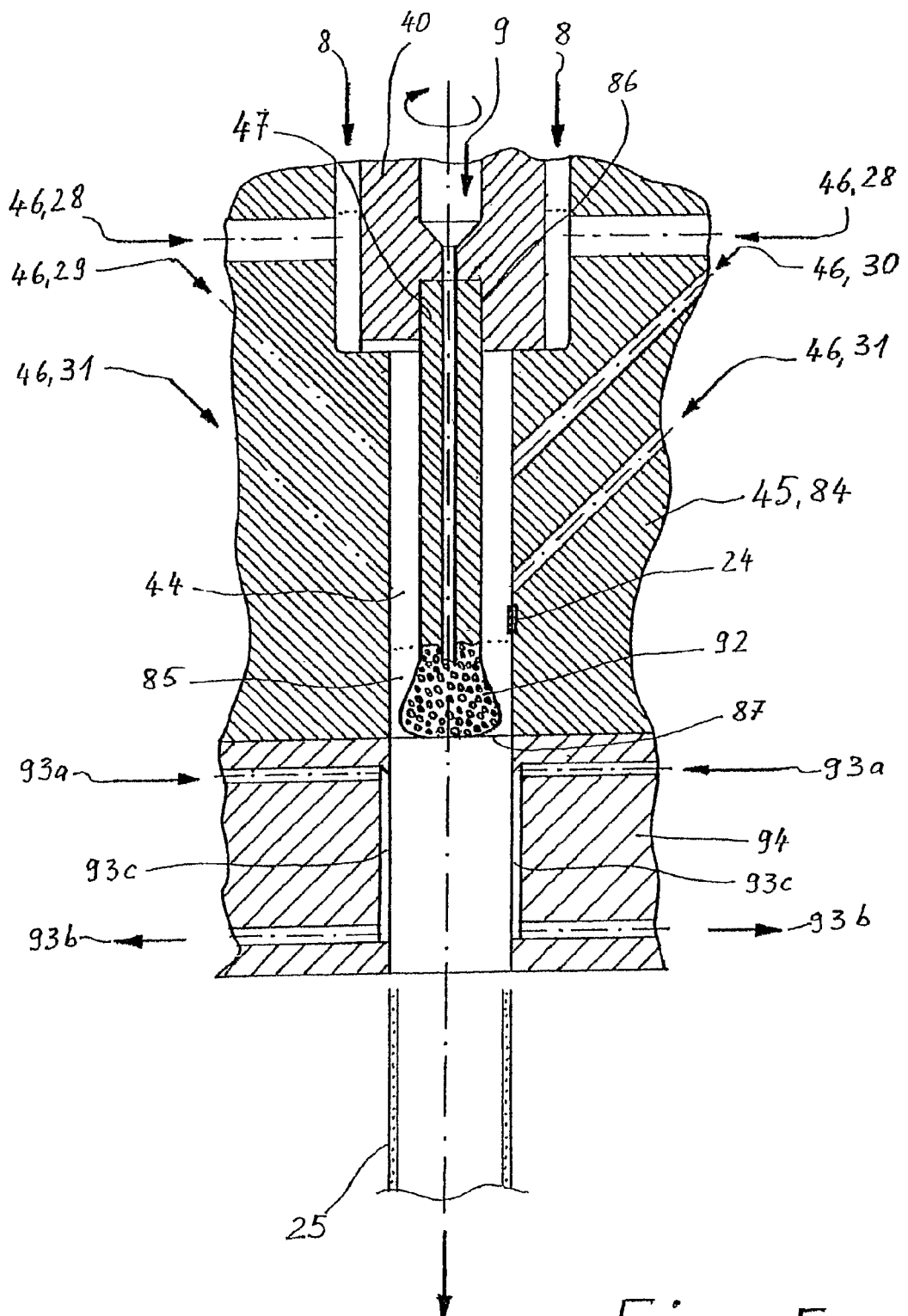

FIG. 5e shows a further practical embodiment of discharge nozzle 45. The difference by comparison with the preceding nozzles 45 lies here in the fact that the rod 47 has a plug form at the head 92, unlike those shown so far. The plug is made of a porous material with micropores 92. That is why a more even capillary 25 is expelled in the inner area.

In addition it is shown that the inlets 46, which have been placed here and in all other representations in the plane of the drawing for better understanding, can also be arranged differently than in the practical embodiments shown so far. The inlets 46 for basic/parent material 28, the additives 29 and the admixtures 30 as well as for the additional component 31 run perpendicular to the direction of discharge 87 and are arranged in the area of the through shaft 40 and in the area of the rod 47. Here they are distributed over the circumference or the diameter of the basic element 1 and/or of the nozzle head 45. Furthermore, it is possible to arrange the inlet 46 of the individual components in such a way that the components can be metered in tangentially.

Furthermore, FIG. 5e shows that in addition to the pressure medium 8 a suction device 93 is also provided for expelling the capillary 25. The suction head that in accordance with the invention can be placed in front of each nozzle head 45 of the basic element 1 is designed to be exchangeable for the different diameter ranges. As required it can also be used for the second practical embodiment of the basic element 48, but only in a slightly modified form, i.e. adapted to the film thickness and width. The suction head 94 has several inlets 93a distributed over the circumference for the supply of the suction medium, and outlets 93b distributed in the same way for extracting the suction medium. Between the inlets 93a and the outlets 93b the suction medium surrounds the fluid to be discharged and entrains it in its flow so that the fluid is discharged.

Figure 6A:
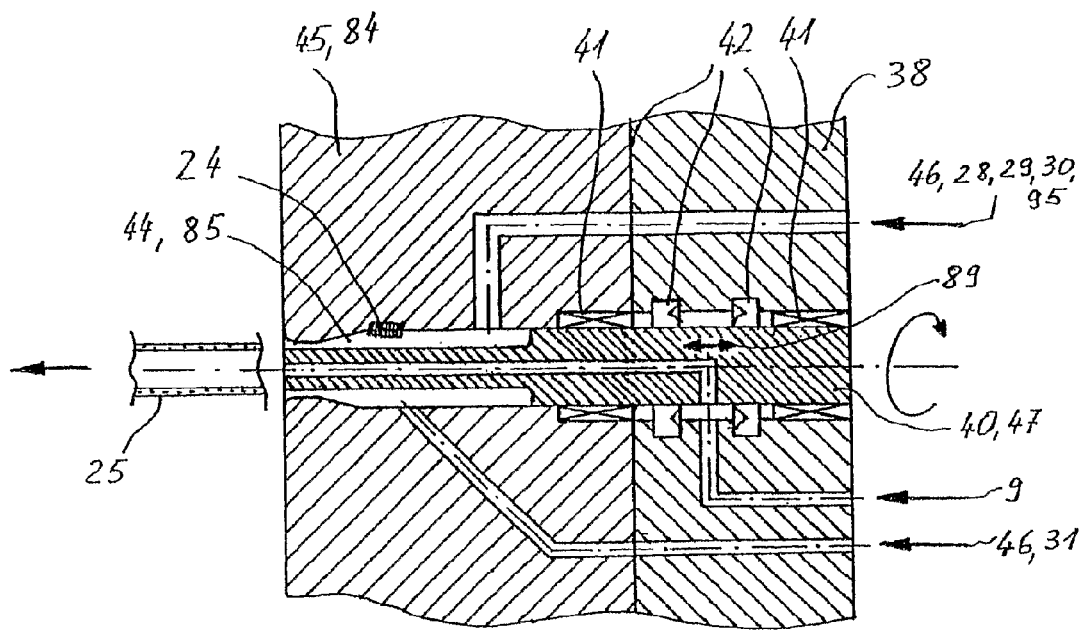
FIG. 6a shows a representation of an alternative practical embodiment of the extrusion die together with an alternative practical embodiment of the discharge nozzle.

FIG. 6a is the representation of a further alternative practical embodiment of the discharge nozzle 45 and a basic element 1 simplified by comparison with FIG. 2 to produce reinforced capillaries 25.

The basic/parent material 28 is mixed in suitable mixing and metering apparatuses 95 (not shown in FIG. 6a) with the additives 29 and admixtures 30 and subsequently introduced into the basic element 1. An additional component 31 is then metered into the basic element 1 shortly before it is discharged. This simplification means that an even considerably shorter installation form can be selected for the basic element 1 with the discharge nozzle 45 than for the practical embodiments shown in FIGS. 5d and 5e.

Thanks to its very short installation form there are much better production engineering options right through to dimensions in the nanometre range for nozzles 45 and rods 47, through which an even smaller diameter of the capillary 25 can be achieved. Equally it is possible to produce strands, threads and fibres 103 as well as films 60 from different materials with the practical embodiment shown in FIG. 6a.

Various operating procedures of the practical embodiments of the extruder presented in the preceding figures are possible:

On the one hand a fixed housing 38 of the basic element can be used together with a fixed core or mandrel (40, 47) that is not driven by rotation. The core (40, 47) is automatically moved forward in the direction of the outlet nozzle 87 or back or oscillated by a flexibly working pressure compensation mechanism 20, for example with cylinders 32. The mixing chamber 44 and the discharge chamber 85 located between the core (40, 47) and housing 84 form the jacket of a cylinder or cone. The basic/parent material 28, the additives 29 and the admixtures 30 are mixed as already shown or metered individually into the discharge chamber 85 and the additional component 31 is added shortly in front of the nozzle.

Furthermore, a rotating housing (38, 84) of the basic element and a fixed core (40, 47) not driven by rotation can be used.

In addition the individual elements of the practical embodiments shown can be combined with each other in accordance with the modular principle. Moreover this facilitates maintenance and cleaning works. For this purpose individual assemblies can also be designed such that they can be connected with the aid of quick locks that can be fixed and/or locked. A further advantage is the very simple, short and compact assembly of the extruder thanks to the modular construction. Assemblies such as drive unit, bearing, through shaft, mixing and discharge module, exchangeable nozzles, suction unit, common housing (divided execution also possible) and sealing packages as well as the pressure units for the supply of the components can be combined simply with each other. If appropriate the heating/cooling system, the control, and if required appropriate sensors and detectors for monitoring can also be added. This allows a simple, flexible and swift assembly of the extruder, in series production too.

The expulsion gas 9 (transport fluid) of the basic elements (1, 48) presented can be used for multiple applications, i.e. both for cooling and heating the parent material used, as well as for inflating the capillary 25, as already described above. The expulsion gas also provides support in drying the products already in the production process. The expulsion gas can also be used as a carrier of aerosols, whereby an additional option for admixing the particles is provided outside the basic unit 1. The expulsion gas can then be used, for example, as a carrier for medicaments, so that the outer areas of the capillary 25 or another product can be provided with a medicinal coating. In the basic element 48 shown, the expulsion gas can be used through the expulsion gas nozzles for unilateral and/or bilateral coating for example with aerosols or medicinal molecules if these nozzles are integrated into the upper and/or lower part. In the same way different kinds of coatings are conceivable here, for example to realise coverings for products.

The expulsion gas can also be used for drying, for example for pre-drying or initial drying of the capillary 25, as well as for accelerating reactions in the parent material used.

Figure 6B:
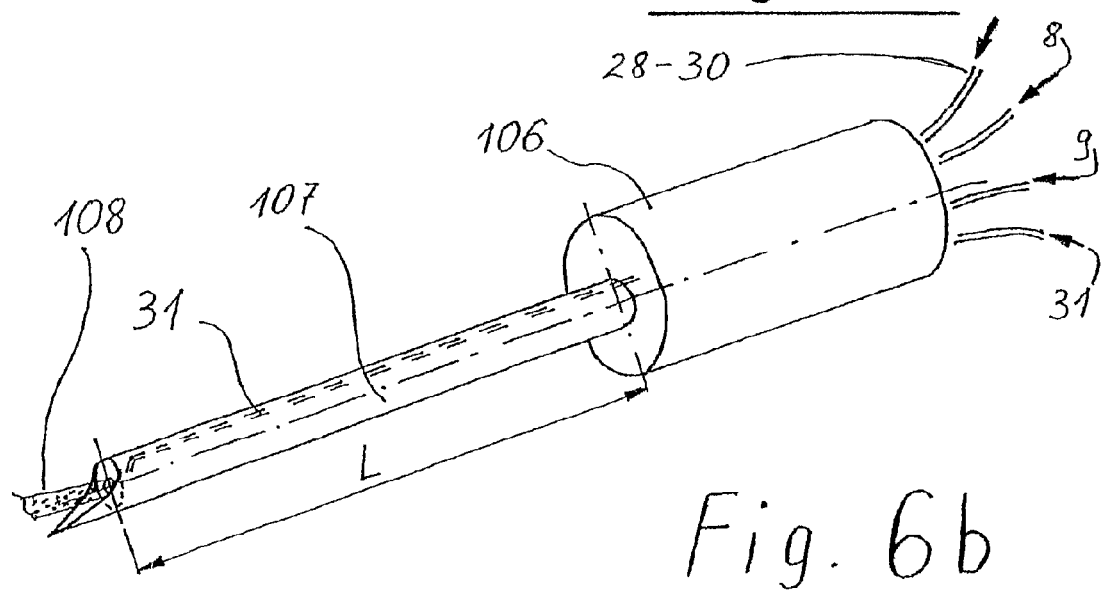
FIG. 6b shows a three-dimensional schematic representation of a further practical embodiment of the extruder system.

FIG. 6b shows a practical embodiment of the extruder system in accordance with the invention for direct introduction of the products 108 that can be provided with admixtures 30 and/or additives 29. A special injection cannula 107 is provided here and the basic elements (1, 48) are connected in series with this. In bodies it is thus possible to introduce the product 108 at spot locations and/or over a full area at defined places.

For example the basic element 1 shown in FIG. 6a can be used without an electric drive 6 but with a device for producing pressure 20. Discharge is then effected through a nozzle 45 in the form of a cannula or through an additional cannula 107. The cannula 107 of the injection unit 106 is designed in the practical embodiment shown in the form of a hollow cylinder with an outer diameter of 3.5 mm. It is thus also possible to introduce a film 60 with a maximum width of 3 mm into a body if an appropriately adapted injection cannula 107 is arranged in front of the basic element 48. The length L of the injection cannula 107 can be freely selected depending on the respective application.

FIG. 7a shows a schematic top view of the basic element 1 with exchangeable nozzle 45, exchangeable rod 47, suction head 94 and appropriate guides from above. A precise guide 96, 97, 98 that is largely free of play and ensures that the said components are oriented exactly with the axis is necessary for the automatic exchange of the nozzles 45. The basic element 1 with the exchangeable nozzle 45, the exchangeable rod 47 and the suction head 94 are installed on the guide 96. The following movements are necessary to exchange the nozzle 45: With the first movement in the direction of the arrow 109, the suction head 94 is moved away from the basic unit 1 with the aid of suitable movement mechanisms up to a defined position. The exchangeable nozzle 45 is moved with a second movement along the arrow 110 up to a defined point, from which the exchangeable nozzle 45 is moved sideways to the guide 97 in the direction of arrow 111 in a depot 90. In this depot 90 the change to another or the same nozzle 45 is carried out manually or preferably automatically. After this the handling device 115 for the exchangeable rod 47 is moved along the third guide 98 in the direction of the arrow 114 up to the first guide 96.

In the handling device 115 a gripper mechanism 116 is provided that extends to the exchangeable rod 47 and grabs it. The movements are indicated by the arrows 113a, 113b in FIG. 7a. After this is checked by installed compressive force sensors 117, a quarter-turn is executed with a turning movement 112 and the exchangeable rod 47 is let loose. The exchangeable rod 47 is then withdrawn parallel to the arrow 113a from the through shaft 40 of the basic unit 1.

With a movement in the direction of the arrow 114, the handling device 115 moves on the third guide way 98 up to the depot 91 for exchangeable rods. There the corresponding exchangeable rod 47 is set down at a predetermined position and a new rod 47 is picked up. In order to bring the new components to their corresponding place the procedure described is executed in the reverse sequence. After this the basic element 1 of the extruder system is ready for operation again. Despite the several movements (109-114) necessary for this change, the automatic and very precise exchange of exchangeable nozzle 45 and exchangeable rod 47 is possible within a very short time. Changing by hand does not produce the necessary precision here and would thus take considerably longer (even though it is possible). The movements (109-114) described are executed electro-mechanically and by way of alternative also pneumatically with appropriate drives. On the grounds of the small dimensions micro-motors and precision transmissions are used. As an alternative, micro-positioning systems can be used, and for correspondingly larger dimensions electric motors and positioning systems. The movements (109-114) and the positioning are monitored and steered with appropriate sensors.

Figure 7B:
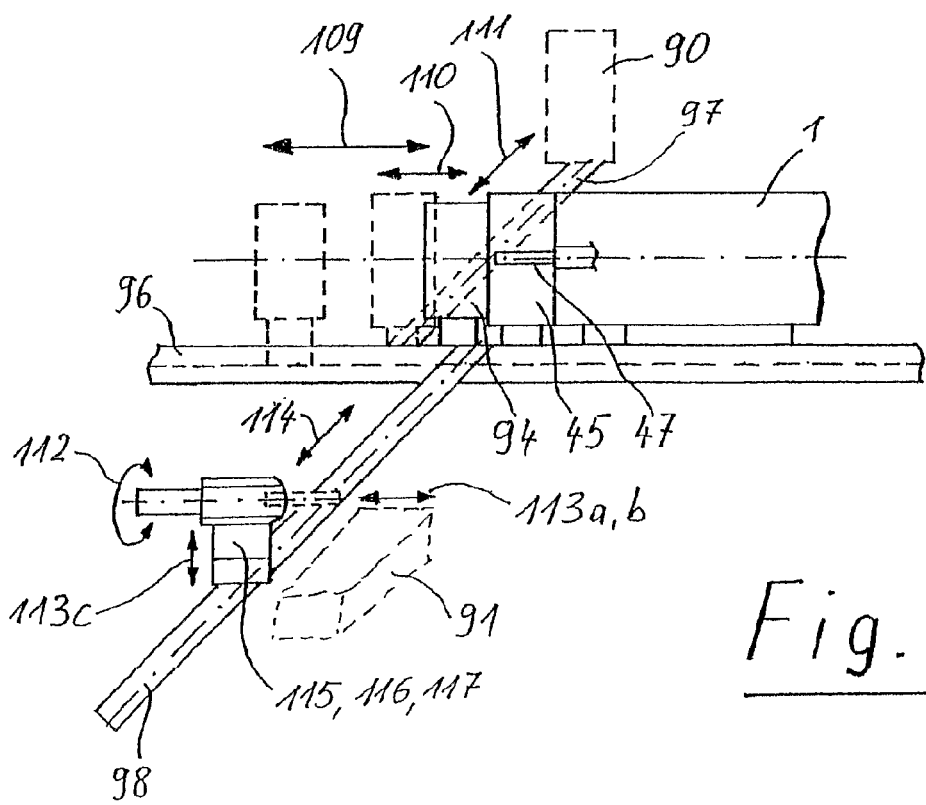

FIG. 7b shows a side view of the device represented in FIG. 7a. The basic element 1 with exchangeable rod 47, the exchangeable nozzle 45 and suction head 94 are installed in one axis on the first guide 96, whereby the guide 96 is arranged below the basic unit 1. However, by way of alternative it can also be arranged above the individual elements. If the second movement 110 is executed far enough, the third movement 111 can be waived if only the exchangeable rod 47 is to be exchanged.

As an alternative the movements 109-114 to be executed can also be executed by a multi-axial handling robot that is positioned separately next to the basic unit 1. The prerequisite for this is a very high resolution of the axis precision (if possible in the nanometre range) and precise reproducibility (1 μm or more precise) in the controlling of the individual axis point or end and target points. It is also possible to execute the exchangeable unit 118 in accordance with the known principle of a turret head.

FIG. 8a shows a representation of a combination of three basic elements 48 arranged above one another. In other practical embodiments only two or more than three basic elements can be combined.

In the practical embodiment shown, two films 60 are connected after discharge from the basic elements 48 (in FIG. 8a marked I, II, III) via the pulling device 11 that is only shown in stylised form to produce a homogeneous composite film 60. After this the composite film 60 is dried in a drying module 12 connected in series or alternatively used immediately, or it is processed further as described in FIG. 1.

Each individual film 60 is coated with the same or with different additives 29 and admixtures 30, or alternatively the additives 29 and admixtures 30 are introduced into the films.

FIG. 8b shows a representation of a combination of three basic elements 1 arranged next to each other. Three capillaries are passed over the pulling devices 11 after the discharge and dried jointly within a drying module 12. Alternatively this arrangement can also be used to produce strands, threads, fibres 103 and films 60.

FIG. 8c shows a sectional representation in a direction perpendicular to the direction of discharge for a combination of seven basic elements 1 (designated I-VII). On the basis of the very small dimensions of the basic elements 1 in accordance with the invention, a large number of basic elements 1 can be pooled in a very small space. That is why high efficiency can be achieved in the operation of the extruder system, especially as the supplies to the individual basic elements 1 can be optimised and pooled and operated via a common supply and pressure unit 20.

FIG. 9a shows a schematic representation of a further practical embodiment of the invention. The arrangement shown consists of two basic elements 1 in accordance with the invention, by way of alternative more than two basic elements 1 are conceivable, and several discharge nozzles 45 arranged in spatial distribution, fixed and connectable to the basic element 1 for capillaries 25 or strands, threads, fibres 103 and flat film nozzles 56 for films 60. Spatial shifting, for example, of the one basic element 1 to a nozzle head 45 and mounting on this, and shifting of the second basic element 1 to a flat film nozzle 56 and mounting on this, make it possible to produce a capillary 25 and a film 60 at the same time. All other possible combinations are also conceivable here. In order to realise this spatial shifting or positioning, semi-automatic, or even better, fully automatic positioning devices that must possess very high precision and repeat accuracy are necessary, this can for example be realised with the help of positioning devices with resolutions for positioning in the nanometre range.

Figure 9B:
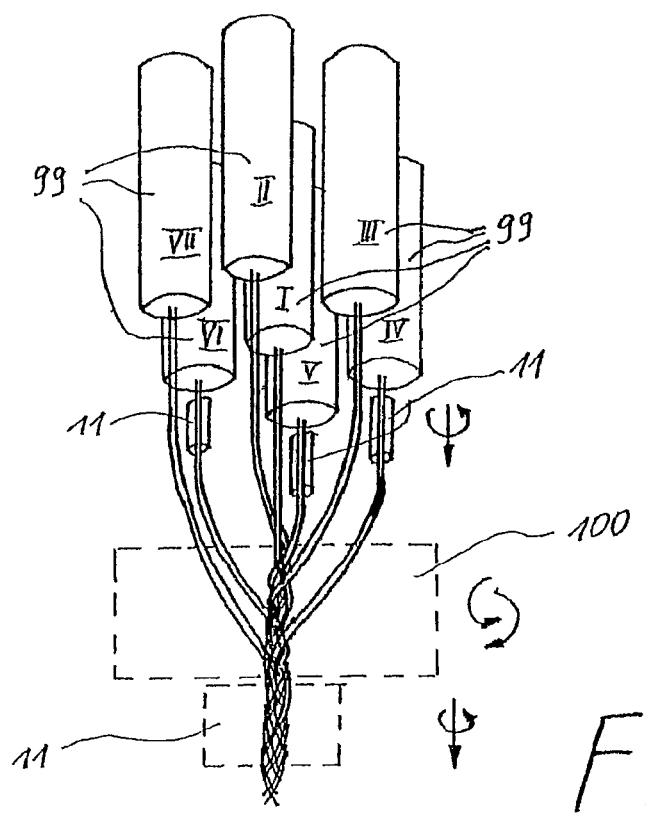

FIG. 9b shows a schematic representation of a further possible practical embodiment and possible application of the basic element presented. A micro-strand device 99 for producing a braided strand is formed from a combination of basic elements.

In the practical embodiment of the basic element 99 shown in FIG. 9b the expulsion medium 9 is not introduced through the through shaft 40 and the rod or micro-rod 47, but instead is passed via the housing 38 of the nozzle head 45 into the discharge chamber 85. By way of alternative the micro-rod 47 is shortened resulting in a longer discharge chamber 85 without micro-rod 47. The product is then a strand and not a capillary as in the practical embodiments described before.

Irrespective of which basic unit (1, 48, 99) is used in this arrangement, the device is mounted standing vertically, whereby the pulling devices 11 are connected in series (FIG. 9b shows only three of seven possible pulling devices 11 in order to retain clarity in the figure). The individual strands are passed subsequently through a braiding device 100 and finally stretched in a pulling device 11 in order to produce a uniformly braided strand 104. During the production the basic units 99 must be moved alternately against each other around a core, e.g. a thread, so that a strand 104 can be braided.

By way of alternative to the braiding device 100, a twisting device 102 can be used whereby the basic elements (1, 48 or 99) are firmly installed and the threads 103, capillaries 25 or films 60 are turned about each other or twisted with each other. This results in enhanced strength of the products.

Number Allocations
1 Basic element
2 Supply device
3 Mixer device
4 Extrusion die
5 Discharge nozzle
6 Drive
7 Transmission
8 Pressure medium
9 Expulsion gas
10 Closing unit
11 Pulling device
12 Drying device
13 Cutting device
14a Winding device
14b Folding and laying device
14c Assembly unit
14d Packing unit
15 Storage
16 Transport
17 Application
18 Heating and cooling system
19 Control and instrumentation unit
20 Device for producing pressure
21 Control valve
22 Pressure controller
23 Pressure sensor
24 Sensor for monitoring the mixing
25 Capillary
26 Sensors and detectors for monitoring capillaries and/or films
27 Moisture sensors
28 Basic/parent material
29 Additives
30 Admixtures
31 Additional component
32 Cylinder
33 Medium and substance inlet
34 Return supply
35 Feed supply
36 Temperature sensors
37 Moistening device
38 Housing
39 Flange cover
40 Through shaft
41 Preloaded bearing,
42 Sealing package
43 Compensation coupling
44 Mixing section
45 Nozzle head, exchangeable nozzle
46 Inlets
47 Rod, micro-rod, exchangeable rod
48 Alternative practical embodiments of the basic element
49 Basic body
50 Cover plate
51 Structured duct
52 Setting area/range
53 Connecting plate
54 Sealing system
55 Pressure-resistant screw fittings
56 Flat film nozzle-exchangeable part
57 Pressure range
58 Mixing section
59 Mixing elements
60 Films
61 Outlet
62 Expulsion gas nozzles
63 Metering and mixing units
64 Housing
65a Suction and pressure gripper unit
65b Suction and pressure gripper unit
66a Drive, adjustable
66b Drive, adjustable 66c Drive, adjustable
66d Drive, adjustable
67a Drive, rotational movement
67b Drive, rotational movement
68 Vacuum and compressed air supply
69 Pair of grippers (from 65a, 65b)
70 Distance X of the grippers
71a Gripper conveyor belt
71b Gripper conveyor belt
71c Gripper conveyor belt
71d Gripper conveyor belt
72 Distance Y of the gripper conveyor belts
73 Torque sensors
74 Speed sensors
75 Length Z adjustable of the gripper conveyor belts
76 Semi-circular duct
77 Outlet nozzles
78 Inlet supply
79 Inlet supply ducts to the nozzle
80 Blower nozzles
81 Suction nozzles
82 Nozzle surface
83 Film gripper
84 Housing of capillary nozzle
85 Discharge chamber
86 Connection to through shaft 40
87 Nozzle outlet
88 Side outlet apertures
89a Adjusting option I
89b Adjusting option II
90 Depot exchangeable nozzle
91 Depot exchangeable rods
92 Porous micropore head of the rod/micro-rod 47
93a Inlet
93b Outlet
93c Suction medium—suction ducts
94 Suction head
95 Mixing and metering apparatus
96 Guide I
97 Guide II
98 Guide III
99 Micro-strand basic unit
100 Braiding device
101 Coatings
102 Twisting device
103 Threads, strands, fibres
104 Strand, braid
105 Twisting device
106 Basic element in injection form
107 Injection cannula
108 Medical products
109 Movement 1
110 Movement 2
111 Movement 3
112 Movement 4
113a Movement 5a
113b Movement 5b
113c Movement 5c
114 Movement 6
115 Handling device—exchangeable rod
116 Gripper mechanisms for exchangeable rod 47
117 Compressive force sensor
118 Exchangeable unit

The invention claimed is:

1. An Extruder system for extruding a fluid comprising:
a basic element having, successively arranged along a longitudinal axis,
at least one supply device,
at least one mixer device,
at least one extrusion die, and
a discharge nozzle with a nozzle outlet,
wherein a housing which is part of the mixer device and extrusion die extends along the longitudinal axis and wherein a suction head is arranged at the nozzle outlet, wherein an inner surface of the housing and an outer surface of a rod which extends within said housing define a cavity extending along said longitudinal axis, wherein the cavity defines, within the mixer device, a mixing chamber, and within the extrusion die, a discharge chamber, wherein the discharge chamber opens into the nozzle outlet and wherein, at an end of the mixer device which is proximal to the supply device, an input for a fluid to be extruded into the mixing chamber is provided, wherein the housing further comprises inlets for a transport fluid which lead into the mixing chamber and wherein the transport fluid is, in said mixing chamber, a gas under pressure wherein the inlets are fluidly connected to at least one device that produces a pressurized transport fluid and wherein the inlets are arranged such that the transport fluid completely or partially surrounds the fluid to be extruded to reduce friction between the fluid to be extruded and the housing and that the transport fluid and the fluid to be extruded flows essentially parallel in direction of the nozzle outlet of the fluid to be extruded, and whereby the fluid to be extruded is discharged from the extruder system by pressure or by suction and pressure of the transport fluid.

2. The Extruder system of claim 1, wherein the pressure for discharging the fluid to be extruded is provided by an expulsion gas.

3. The Extruder system of claim 1, wherein the discharge nozzle or parts thereof are exchangeable.

4. The Extruder system of claim 1, wherein the at least one device that produces the transport fluid flow is at least partially provided in form of exchangeable parts.

5. The Extruder system of claim 1, wherein the suction head is designed such that it can be exchanged for different product diameter ranges.

6. The Extruder system of claim 1, further comprising at least one compensation duct for compensating metering fluctuations over the transport fluid flow and which is completely or partially surrounding the fluid to be extruded.

7. The Extruder system of claim 3, wherein the dimensions of the discharge nozzle are adjusted to the fluid to be shaped and wherein the fluid is discharged by capillary forces.

8. The Extruder system of claim 1, further comprising a mandrel as a rotatable part of the extruder system that is arranged symmetrically to a cross-section of the extruder system and that extends parallel to the direction of discharge.

9. The Extruder system of claim 1, further comprising at least one pulling device for drawing off the discharged fluid which is arranged behind the discharge nozzle of the extrusion die.

10. The Extruder system of claim 9, wherein at least two pulling devices are arranged behind the discharge nozzle, wherein the at least two pulling devices are arranged one behind the other, so that a capillary emerging the discharge nozzle is first passed on to the pulling device arranged behind the discharge nozzle and then passed on to the consecutive pulling device, wherein the at least two pulling devices are built such that they have different pulling speeds.

11. The Extruder system of claim 9, wherein the at least one pulling device is rotatable about an axis parallel with a direction of pulling.

12. The Extruder system of claim 1, wherein a basic element of the extruder system, is rotatable about an axis in direction of discharge.

13. The Extruder system of claim 1, further comprising an adjustable heating and cooling device for the fluid.

14. The Extruder system of claim 1, further comprising a drying device for the discharged fluid, wherein the drying device is behind the at least one extrusion die.

15. The Extruder system of claim 1, further comprising a cutting device for the discharged fluid, wherein the cutting device is behind the at least one extrusion die.

16. The Extruder system of claim 1, further comprising a winding device for the discharged fluid, wherein said winding device is behind the at least one extrusion die.

17. The Extruder system of claim 1, wherein the at least one extrusion die is a device for producing a capillary or microcapillary.

18. The Extruder system of claim 17, wherein the discharge nozzle for producing a micro-capillary comprises an inner diameter of less than 100 μm.

19. The Extruder system of claim 1, wherein the at least one extrusion die is a device for producing a film or microfilm.

20. The Extruder system of claim 19, wherein within the discharge chamber the distance between the inner surface of the housing and the outer surface of the rod is such that the film produced at the nozzle outlet has a preferred thickness of 1 μm to 0.5 mm.

21. The Extruder system of claim 1, wherein the at least one extrusion die is a device for producing a strand or a microstrand.

22. The Extruder system of claim 21, wherein within the discharge chamber the distance between the inner surface of the housing and the outer surface of the rod is such that the micro-strands produced at the nozzle outlet have a preferred thickness of 1 μm to 0.5 mm.

23. The Extruder system of claim 12, wherein the basic element of the system has a length of less than 20 cm.

24. The Extruder system of claim 12, wherein the basic element of the system has a diameter of less than 5 cm.

25. The Extruder system of claim 12, further comprising a closing unit to open and close the discharge nozzle, wherein the closing unit is arranged beside the discharge nozzle.

26. The Extruder system of claim 18, wherein the inner diameter is less than 20 μm.

27. The Extruder system of claim 19, wherein within the discharge chamber the distance between the inner surface of the housing and the outer surface of the rod is such that the film produced at the nozzle outlet has a thickness of up to 50 nm.

28. The Extruder system of claim 21, wherein within the discharge chamber the distance between the inner surface of the housing and the outer surface of the rod is such that the micro-strands produced at the nozzle outlet have a thickness of up to a few nanometers.

29. The Extruder system of claim 23, wherein the basic element of the system has a length of less than 8 cm.

30. The Extruder system of claim 24, wherein the basic element of the system has a diameter of less than 1 cm.

31. The Extruder system of claim 1, wherein the extrusion die or parts thereof is a mandrel.

32. The Extruder system of claim 5, further comprising a nozzle head so that the fluid to be extruded is discharged via the nozzle head, further comprising an injector cannula arranged behind the nozzle head and fluidly connected with the nozzle head, and further comprising a device for producing pressure onto the fluid, so that the fluid to be extruded and to be discharged via the nozzle head enters the injection cannula with the aid of the device for producing pressure.

33. The Extruder system of claim 32, wherein the injection cannula has an outer diameter of 3.5 mm.

34. The Extruder system in accordance with claim 1, wherein the mixer device comprises inlets for basic/parent material, additives or admixtures or additional components, and wherein the inlets are arranged in such a way that the for basic/parent material, additives or admixtures or additional components can be metered in tangentially.

35. The Extruder system of claim 1, wherein the rod has a hollow inner space extending along said longitudinal axis and having, proximal to the supply device, an opening for the transport fluid and at an head of the rod located within the extrusion die, outlet apertures for the transport fluid, wherein the outlet apertures are arranged in intervals around the entire circumference at the head of the rod.

36. The Extruder system of claim 1, wherein the extrusion die or parts thereof can be rotated motor-driven about said axis.

37. The Extruder system of claim 1, wherein the inlets for the transport fluid in the housing extend perpendicular relative the longitudinal axis.

38. The Extruder system of claim 1, wherein the inlets for the transport fluid are arrange such that the transport fluid can metered in tangentially into the cavity.

39. The Extruder system of claim 1, wherein the mixer device further comprises sensors.

40. The Extruder system of claim 1, wherein the suction head comprises inlets and outlets, which are optionally connected by suction ducts.

41. The Extruder system of claim 1, wherein the suction head abuts to the housing at the nozzle outlet.

42. The Extruder system of claim 1, wherein the outer circumference of the housing is constant at the mixer device, extrusion die and discharge nozzle.

43. The Extruder system of claim 23, wherein the extruder system is portable.

\* \* \* \* \*